United States Patent [19]
Hasegawa et al.

[11] Patent Number: 5,973,892
[45] Date of Patent: Oct. 26, 1999

[54] HEAD CLEANER FOR MAGNETIC RECORDING/REPRODUCING APPARATUS HAVING A CLEANING ROLLER WITH ABRADING CAPABILITY

[75] Inventors: Kenji Hasegawa, Kadoma; Yoshiaki Mizoh, Neyagawa; Norimoto Nouchi, Katano; Masaya Sakaguchi, Neyagawa; Keizou Miyata, Moriguchi; Tetsuo Fuchi, Osaka, all of Japan

[73] Assignee: Matsushita Electric Industrial Co., Ltd., Osaka, Japan

[21] Appl. No.: 08/635,353

[22] Filed: Apr. 19, 1996

[30] Foreign Application Priority Data

Apr. 19, 1995 [JP] Japan ..................... 7-093339
Sep. 1, 1995 [JP] Japan ..................... 7-248836

[51] Int. Cl.⁶ ....................................... G11B 5/41
[52] U.S. Cl. ............................................. 360/128
[58] Field of Search ....................... 360/128, 137

[56] References Cited

U.S. PATENT DOCUMENTS

| | | | |
|---|---|---|---|
| 4,661,874 | 4/1987 | Buehl et al. | 360/128 |
| 5,021,912 | 6/1991 | Shao-Yung | 360/128 |
| 5,096,464 | 3/1992 | Yamamoto | 51/293 |
| 5,213,589 | 5/1993 | Ronning et al. | 51/293 |
| 5,353,184 | 10/1994 | Clausen | 360/137 |
| 5,370,718 | 12/1994 | Terazawa et al. | 51/295 |
| 5,420,757 | 5/1995 | Eberhardt et al. | 361/813 |
| 5,453,893 | 9/1995 | Nouchi et al. | 360/128 |
| 5,453,894 | 9/1995 | Kim et al. | 360/128 |
| 5,543,179 | 8/1996 | Nouchi et al. | 427/346 |
| 5,602,705 | 2/1997 | Nouchi et al. | 360/128 |
| 5,611,826 | 3/1997 | Ryoke et al. | 360/128 |

FOREIGN PATENT DOCUMENTS

| | | |
|---|---|---|
| 62-028915 | 2/1987 | Japan . |
| 3-241512 | 10/1991 | Japan . |
| 3-288308 | 12/1991 | Japan . |
| 4-205809 | 7/1992 | Japan . |
| 5-062132 | 3/1993 | Japan . |
| 6-150263 | 5/1994 | Japan . |
| 7-296345 | 11/1995 | Japan . |

Primary Examiner—Jefferson Evans
Attorney, Agent, or Firm—McDermott, Will & Emery

[57] ABSTRACT

A head cleaner for a magnetic recording and/or reproducing apparatus for cleaning rotary magnetic heads. The head cleaner includes a rotary spindle rotatably mounted on a support arm movable between an operative position, in which the head cleaner is in position to clean the magnetic heads, and an inoperative position separated from the magnetic heads. The head cleaner also includes a plurality of oblong webs of non-woven fabric with or without an abrasive material coated on one surface thereof. The oblong webs of non-woven fabric are fixedly secured to the rotary spindle so as to extend radially outwardly therefrom while being spaced an equal distance from each other in a direction circumferentially thereof.

6 Claims, 24 Drawing Sheets

HEAD CLEANER FOR MAGNETIC RECORDING/REPRODUCING APPARATUS HAVING A CLEANING ROLLER WITH ABRADING CAPABILITY

BACKGROUND OF THE INVENTION

1. Field of the Invention

The present invention relates to a magnetic head cleaner for a magnetic recording and/or reproducing apparatus. The present invention also pertains to a method of making the magnetic head cleaner and a magnetic recording and/or reproducing apparatus utilizing the magnetic head cleaner so manufactured.

2. Description of the Prior Art

In a magnetic recording and/or reproducing apparatus such as, for example, a video tape recorder (VTR), a digital audio tape (DAT) recorder and a digital data storage (DDS) device, of a type utilizing a rotary magnetic head assembly, a rotary head-carrier drum carrying a plurality of magnetic recording and/or reproducing heads mounted thereon rotates at a high speed to cause the magnetic heads to undergo an angular movement in a common plane about the axis of rotation of the head carrier. In this apparatus, it has been experienced that adherence or sticking of foreign matter to some or all of the rotary magnetic heads brings about a spacing loss by which the recording or reproducing capability of the rotary magnetic heads is apt to be reduced to such an extent as to result in reduction in reliability of the apparatus.

Foreign matter tending to adhere to the rotary magnetic heads includes fibrous or particulate dust, powdery magnetic particles disintegrated from a length of magnetic tape as the latter travels in sliding contact with the rotary magnetic heads and/or the rotary head-carrier drum, binder particles or a finely divided scraps of component parts forming a tape transmission system or a mixture thereof. To remove a deposit of foreign matter from the rotary magnetic heads, it is known to use a magnetic head cleaner. By way of example, the Japanese Laid-open Patent Publication No. 3-241512, published in 1991, discloses a magnetic head cleaner of a generally cylindrical configuration made of a soft member such as, for example, a sponge material. Cleaning of the rotary magnetic heads to remove the deposit of foreign matter from an operating surface of each magnetic head is carried out at intervals of a predetermined time.

More specifically, with reference to FIG. 32, the head cleaner 80 disclosed in the Japanese publication referred to above includes a tubular soft member 69 mounted on a spindle which is in turn rotatably mounted on a support arm movable between operative and inoperative positions in a direction as indicated by the arrow 68. A magnetic information recording and/or reproducing apparatus shown therein includes a head-carrier drum 7 carrying at least one magnetic recording and/or reproducing head 76 for rotation together therewith in a direction shown by the arrow 41, a stationary drum 8 coaxially positioned below the head-carrier drum 7, a length of magnetic tape 38 running from a supply reel (not shown) to a take-up reel (not shown) by way of the head-carrier drum 7 having been guided by rotary guide posts 20 and 27 and inclined guide posts 29 and 30.

The soft member 69 is in the form of a tubular sponge with or without abrasive particles such as, for example, alumina particles impregnated therein.

On the other hand, U.S. Pat. No. 5,453,893 discloses a magnetic head cleaner made of a soft material impregnated with abrasive particles to render the outer peripheral surface of the magnetic head cleaner to exhibit an abrasive action on the rotary magnetic heads to remove the deposit of foreign matter sticking to the rotary magnetic heads.

It has, however, been found that with the design in which only the soft member slidingly contacts the rotary magnetic heads, no sufficient cleaning effect can be obtained. With the design wherein the abrasive particles are impregnated, that portion of the soft member impregnated with the abrasive particles which is brought into contact with the rotary magnetic heads tends to be inwardly recessed relative to opposite end portions thereof and, once this occurs, the rotary head-carrier drum may be damaged during a cleaning operation and/or insufficient cleaning of the rotary head-carrier drum to remove the foreign matter may take place. Also, disintegration of the abrasive particle may result in damage to the length of magnetic recording tape and/or to the magnetic recording and/or reproducing heads, accompanied by reduction in reliability.

SUMMARY OF THE INVENTION

Accordingly, the present invention is intended to provide an improved head cleaner for a magnetic recording and/or reproducing apparatus for cleaning rotary magnetic heads.

To this end, the head cleaner according to the present invention includes a rotary spindle rotatably mounted on a support arm movable between an operative position, in which the head cleaner is in position to clean the magnetic heads, and an inoperative position separated from the magnetic heads. In one aspect of the present invention, the head cleaner also includes a soft member fixedly positioned around the rotary spindle and having an outer peripheral surface formed with axial projections and grooves alternating with each other in a direction circumferentially thereof. At least the projections are impregnated with an abrasive material.

In another aspect of the present invention, the head cleaner includes a plurality of oblong webs of non-woven fabric with or without an abrasive material coated on one surface thereof. The oblong webs of non-woven fabric are fixedly secured to the rotary spindle so as to extend radially outwardly therefrom while being spaced an equal distance from each other in a direction circumferentially thereof In a further aspect of the present invention, the head cleaner includes a generally tubular soft member having an outer peripheral surface to which a cleaning sheet is secured by the use of, for example, a length of double-sided adhesive tape. The cleaning sheet used in this case may be an oblong web of non-woven fabric having one surface coated at least partially with the abrasive material and is bonded to the soft member with the coated surface thereof oriented outwardly.

In any event, because of the head cleaner having an abrading capability, foreign matter sticking stubbornly to the magnetic head can effectively and efficiently removed while the removed foreign matter can be trapped into the grooves or interstices of fibers forming the non-woven fabric. Accordingly, with the head cleaner of the present invention, removal of the foreign matter from the rotary magnetic head takes place without the magnetic head and the head-carrier drum being damaged or scratched.

The present invention also pertains to a magnetic recording and/or reproducing apparatus utilizing the head cleaner herein disclosed.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
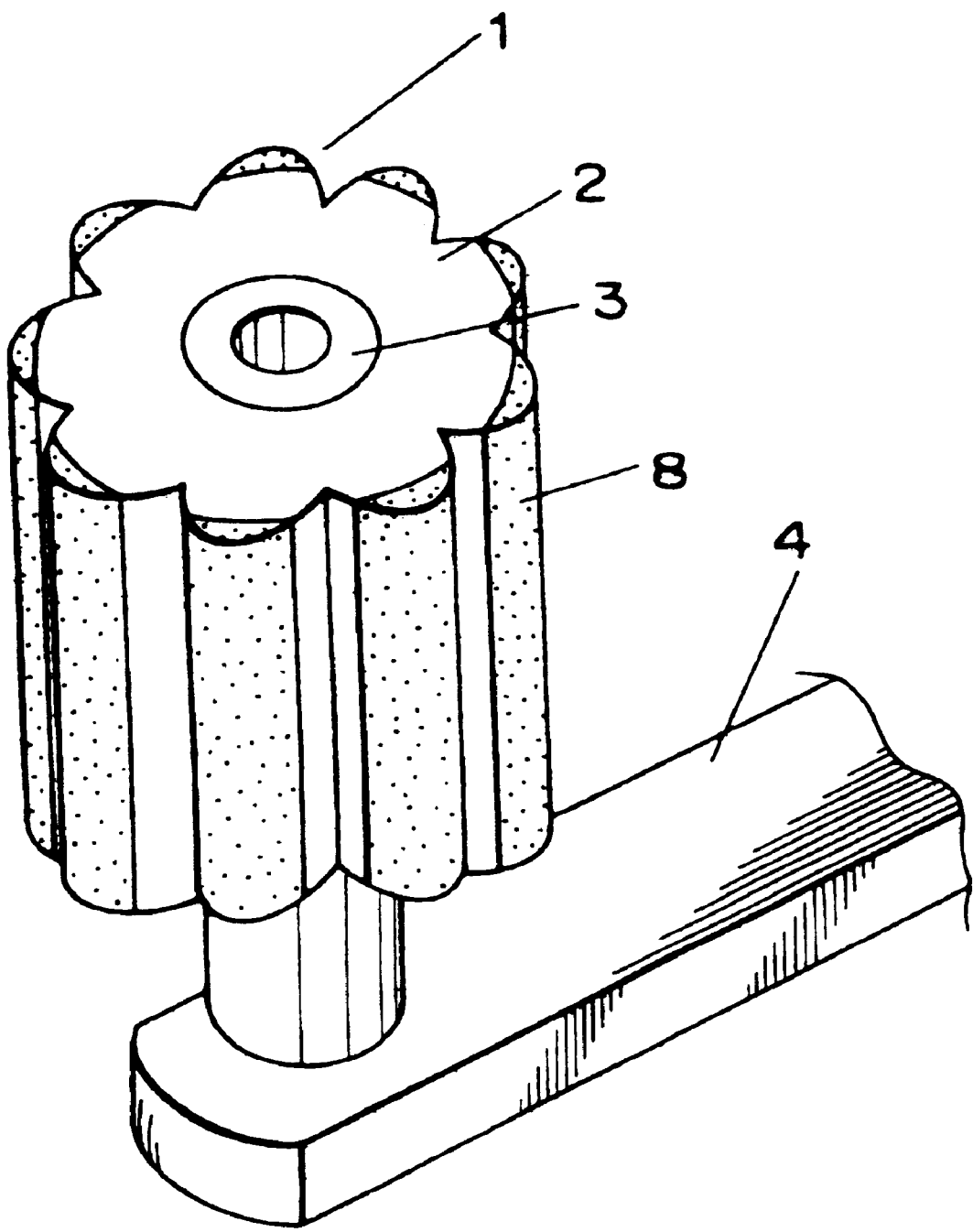
FIG. 1 is a schematic perspective view of a head cleaner according to a first preferred embodiment of the present invention.

First Embodiment—FIG. 1

Referring to FIG. 1, a head cleaner according to a first preferred embodiment of the present invention comprises a generally cylindrical roller 1 including a spindle 3 rotatably mounted on a support arm 4. The roller 1 also includes a soft member 2 made of, for example, a sponge material molded into a shape similar to a pinion gear with the use of a mold having a gear-shaped mold cavity. The soft member 2 so molded has an outer peripheral surface formed with a plurality of radially outwardly protruding ridges that extend parallel to each other and also to the longitudinal axis of the spindle 3, each of said radial ridges being impregnated with an abrasive material. The abrasive material used is a mixture of alumina particles of 0.2 $\mu$m in average particle size with a resinous binder such as, for example, polyurethane or polyvinyl chloride.

Preferably, each of the radial ridges is, for example, 100 $\mu$m in distance of protrusion as measured between the root circle, drawn so as to touch the bottom of a groove between the neighboring ridges, and the outside circle drawn so as to touch the top of each ridge.

According to the embodiment shown in FIG. 1, when the rotary roller 1 is brought into contact with the rotary magnetic heads (not shown) then undergoing the angular movement, the ridges that are elastically pliable and has an abrading capability removes foreign matter adhering to the rotary magnetic heads with the removed foreign matter subsequently trapped into grooves each defined between the neighboring ridges.

Thus, according to the illustrated embodiment, since as compared with the prior art cylindrical cleaner surface, the soft member 2 assuredly contacts the rotary magnetic heads, a higher cleaning efficiency can be appreciated. Moreover, since the abrasive material is partially impregnated in the contact surface of the rotary roller 1, any possible deformation of the contact surface is advantageously minimized with no possibility of the rotary head-carrier drum being damaged during the cleaning operation.

Although in the foregoing embodiment alumina particles are used in the abrasive material, a similar effect can be obtained even if one or a mixture of red iron oxide, silicon carbide, chromium oxide, titanium carbide, boron nitride, silicon oxide and free microparticles. An enhanced cleaning effect can be obtained if the distance of protrusion of each radial ridge is greater than the amount of protrusion of each magnetic recording and/or reproducing head protruding outwardly from the outer peripheral surface of the rotary head-carrier drum.

The average particle size of the abrasive material may not be always limited to 2 $\mu$m such as recited in the foregoing description, but may include abrasive particles of varying particle sizes.

Figure 2:
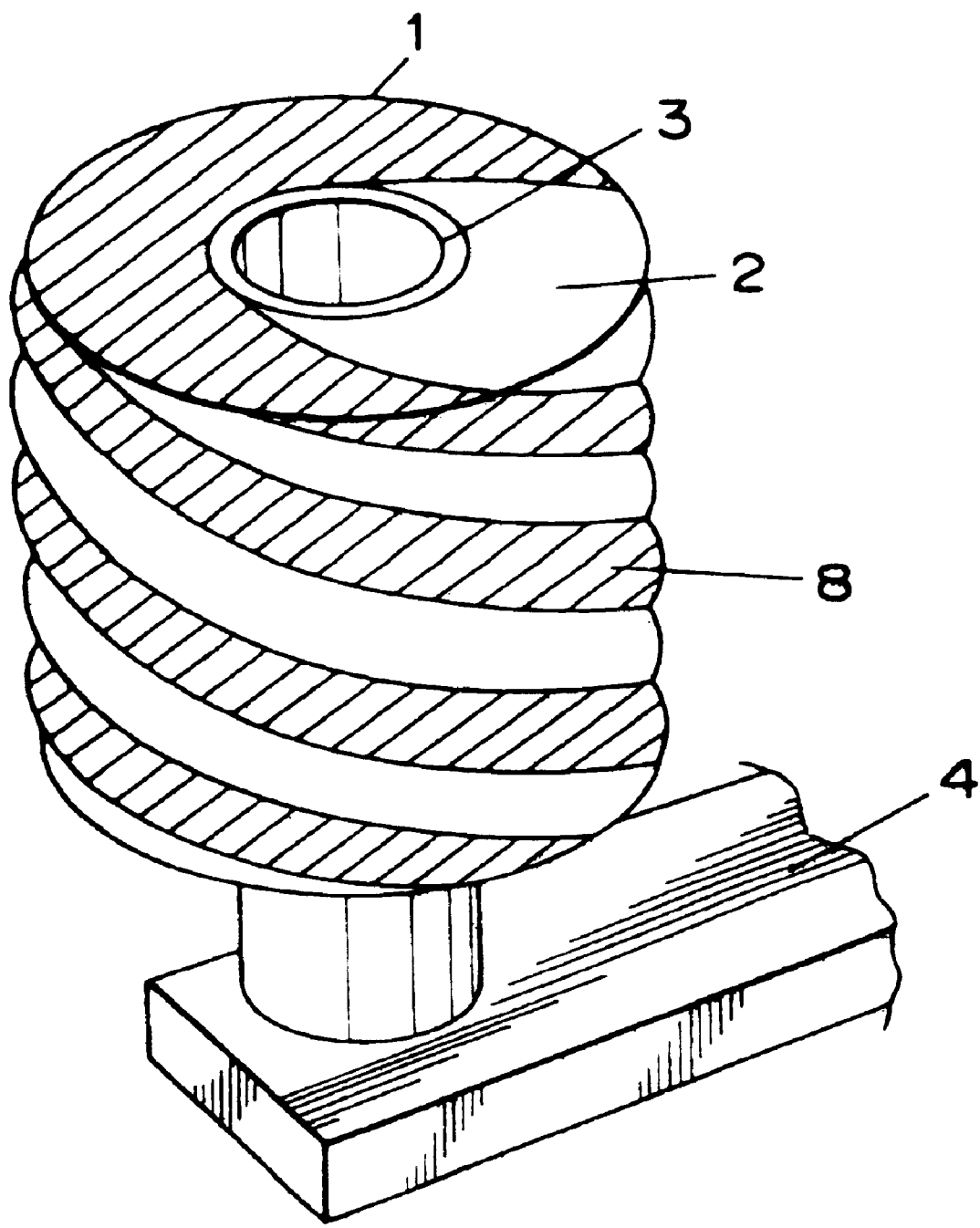
FIG. 2 is a view similar to FIG. 1, showing another preferred embodiment of the present invention.

Second Embodiment—FIG. 2

Referring to FIG. 2, a head cleaner according to a second preferred embodiment of the present invention comprises a generally cylindrical roller 1 including a spindle 3 rotatably mounted on a support arm 4. The roller 1 also includes a soft member 2 made of a ribbon of a sponge material and a ribbon of a brush-like material having an abrading capability. More specifically, the soft member 2 is prepared by spirally turning the ribbon of the sponge material and the ribbon of the brush-like material around the spindle 3 with turns of the ribbon of the sponge material alternating with turns of the ribbon of the brush-like material.

The illustrated head cleaner is fitted in coaxial relation with a spindle for driving the rotary head-carrier drum and hence the rotary magnetic recording and/or reproducing heads.

In this design of the rotary roller 1, the turns of the ribbon of the brush-like material protrude radially outwardly relative to the turns of the ribbon of the sponge material with the maximum distance of protrusion of each turn of the brush-like material chosen to be, for example, 50 $\mu$m.

Considering that the ribbon of the brush-like material and the ribbon of the sponge material are spirally turned around the spindle 3, the turns of the ribbon of the brush-like material extend helical relative to the plane in which the magnetic recording and/or reproducing heads undergo the angular movement during the cleaning operation.

According to the second embodiment of the present invention, respective portions of the rotary roller 1 which have abrading and non-abrading capabilities are alternately brought into contact with the rotary magnetic recording and/or reproducing head during the cleaning operation and, therefore, that portion of the rotary roller 1 having the abrading capability removes the foreign material adhering to the magnetic heads which is subsequently trapped by that portion of the rotary roller 1 having no abrading capability. This embodiment is particularly advantageous in that the foreign matter adhering to the magnetic heads can be highly efficiently removed. Also, since the contact surface of the rotary roller 1 is uniform in shape, there is no possibility that the rotary head-carrier drum may be damaged in contact with the head cleaner.

Figure 3:
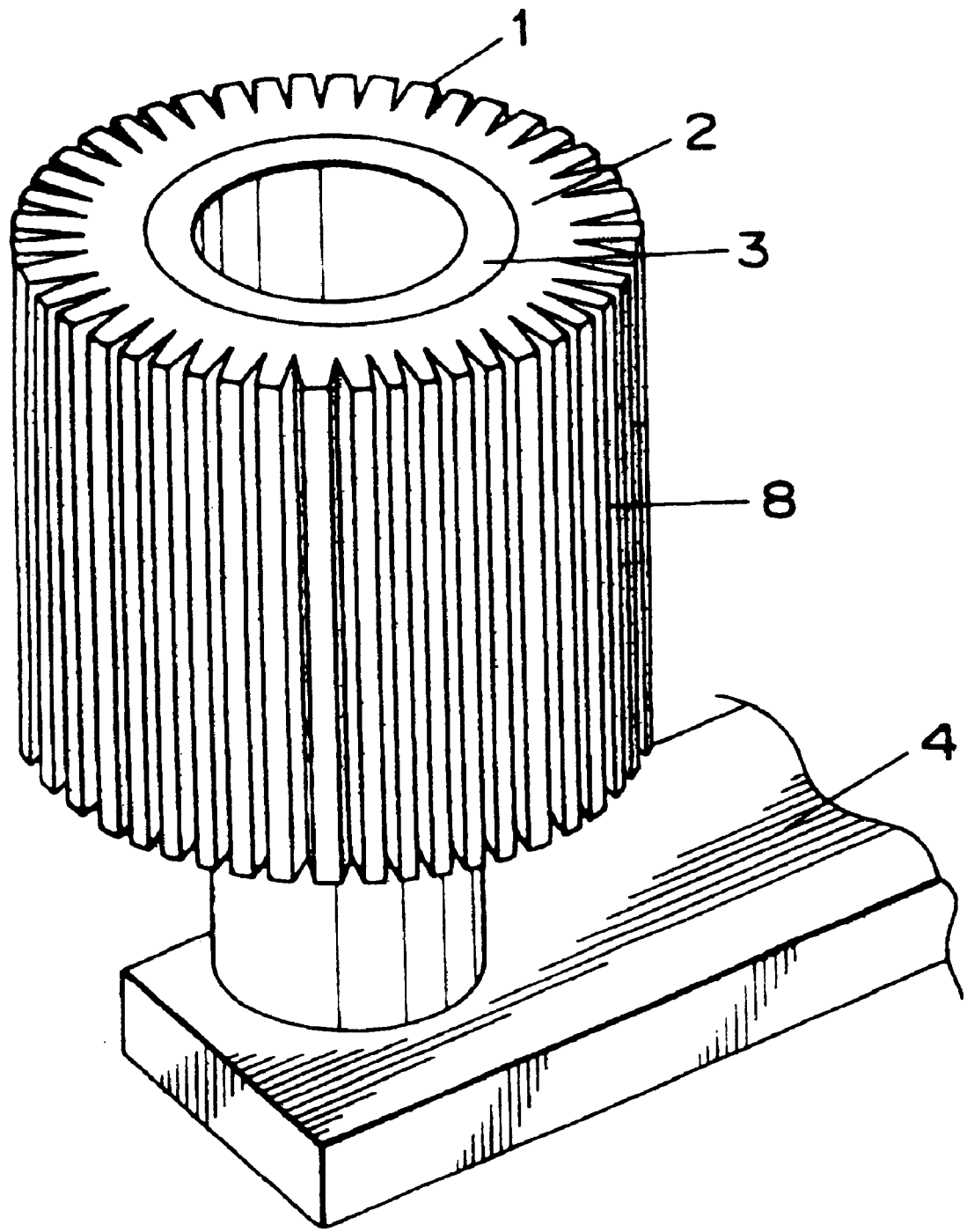
FIG. 3 is a view similar to FIG. 1, showing a third preferred embodiment of the present invention.

Third Embodiment—FIG. 3

Referring to FIG. 3, a head cleaner according to a third preferred embodiment of the present invention comprises a generally cylindrical roller 1 including a spindle 3 rotatably mounted on a support arm 4. The roller 1 also includes a soft member 2 made of, for example, a sponge material and having a plurality of radially outwardly protruding crests formed by scribing parallel cut lines in an oblong web of sponge material in a depth sufficient to allow the radial crests to have a distance of protrusion of, for example, 1,000 $\mu$m. The sponge material for the soft member 2 is impregnated with a mixture of alumina particles of 0.5 $\mu$m in average particle size with a resinous binder such as, for example, polyurethane or polyvinyl chloride.

The spindle 3 may be made of either metal or synthetic resin and is rotatably mounted on the support arm 4 so as to extend perpendicular thereto.

According to the embodiment shown in FIG. 3, when the rotary roller 1 is brought into contact with the rotary magnetic heads (not shown) then undergoing the angular movement, the crests that have an abrading capability removes foreign matter adhering to the rotary magnetic heads with the removed foreign matter subsequently trapped into grooves each defined between the neighboring crests. Since as compared with the prior art cylindrical cleaner surface, the soft member 2 assuredly contacts the rotary magnetic heads, a higher cleaning efficiency can be appreciated. Moreover, since the contact surface of the rotary roller 1 is formed with the cut lines leaving the radially outwardly protruding crests with no possibility of the surface being shrunk in the presence of the abrasive material, the rotary roller 1 represents a uniform cross-sectional shape sufficient to avoid any possible damage to the rotary head-carrier drum during the cleaning operation.

Figure 4:
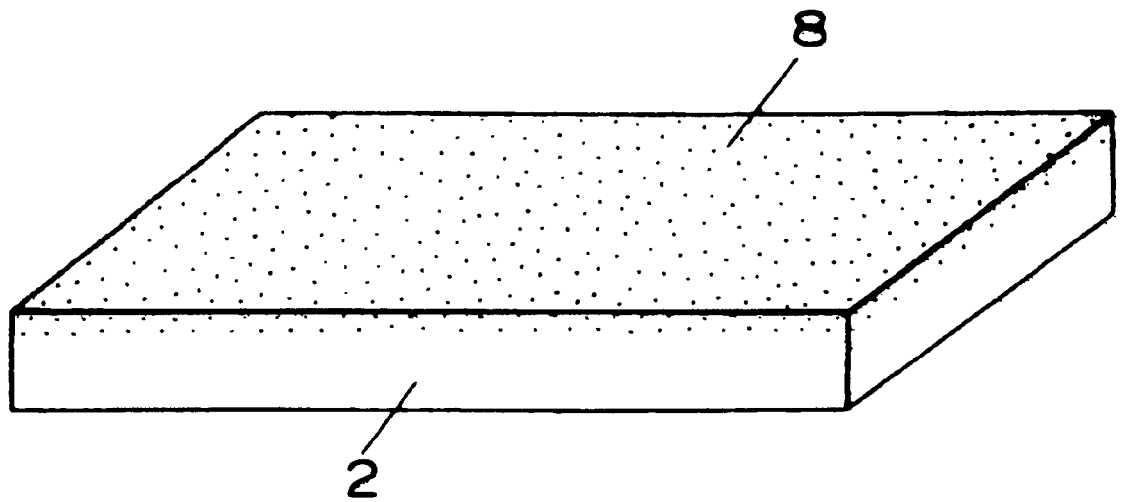
FIGS. 4 to 6 are schematic perspective view showing sequential steps of manufacture of the head cleaner shown in FIG. 3, respectively.
Figure 5:
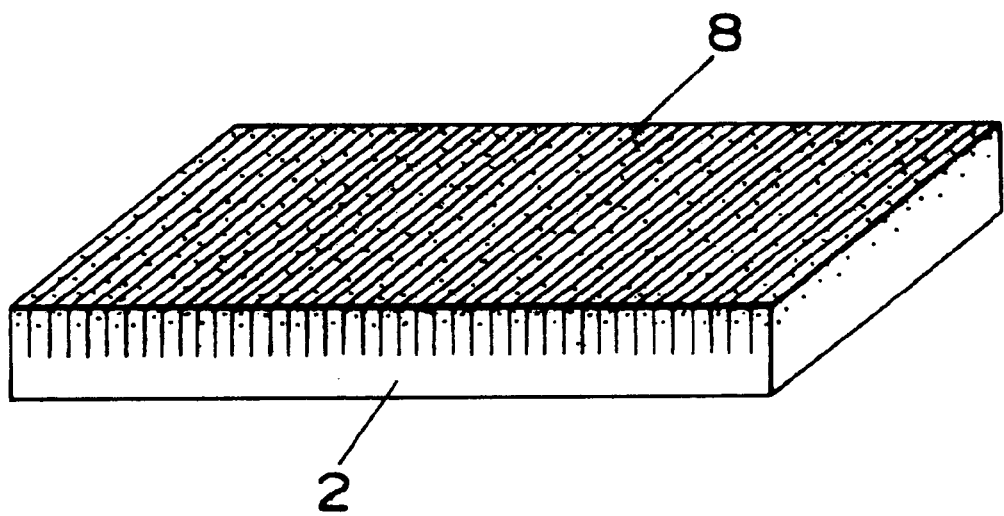

The head cleaner of the structure shown in and described with reference to FIG. 3 can be manufactured in a manner as shown in FIGS. 4 and 5, reference to which will now be made.

As shown in FIG. 4, an oblong web 2 of soft material such as a sponge material is prepared and an abrasive suspension containing alumina particles of 0.5 $\mu$m in average particle size and the binder both dissolved in water or an organic solvent is applied on one of the opposite surfaces of the oblong web 2 of soft material. In this way, the surface of the oblong web 2 of soft material is impregnated with the abrasive particles as indicated by 8.

After the oblong web 2 of soft material impregnated with the abrasive particles 8 has been dried, parallel and equidistantly spaced cut lines are scribed in a depth of 1 mm on that surface of the oblong web 2 of soft material as shown in FIG. 5. Thereafter, as shown in FIG. 6, the oblong web 2 of soft material is turned around the spindle 3 with the opposite surface thereof bonded to the outer peripheral surface of the spindle 3, thereby completing the head cleaner.

Figure 6:
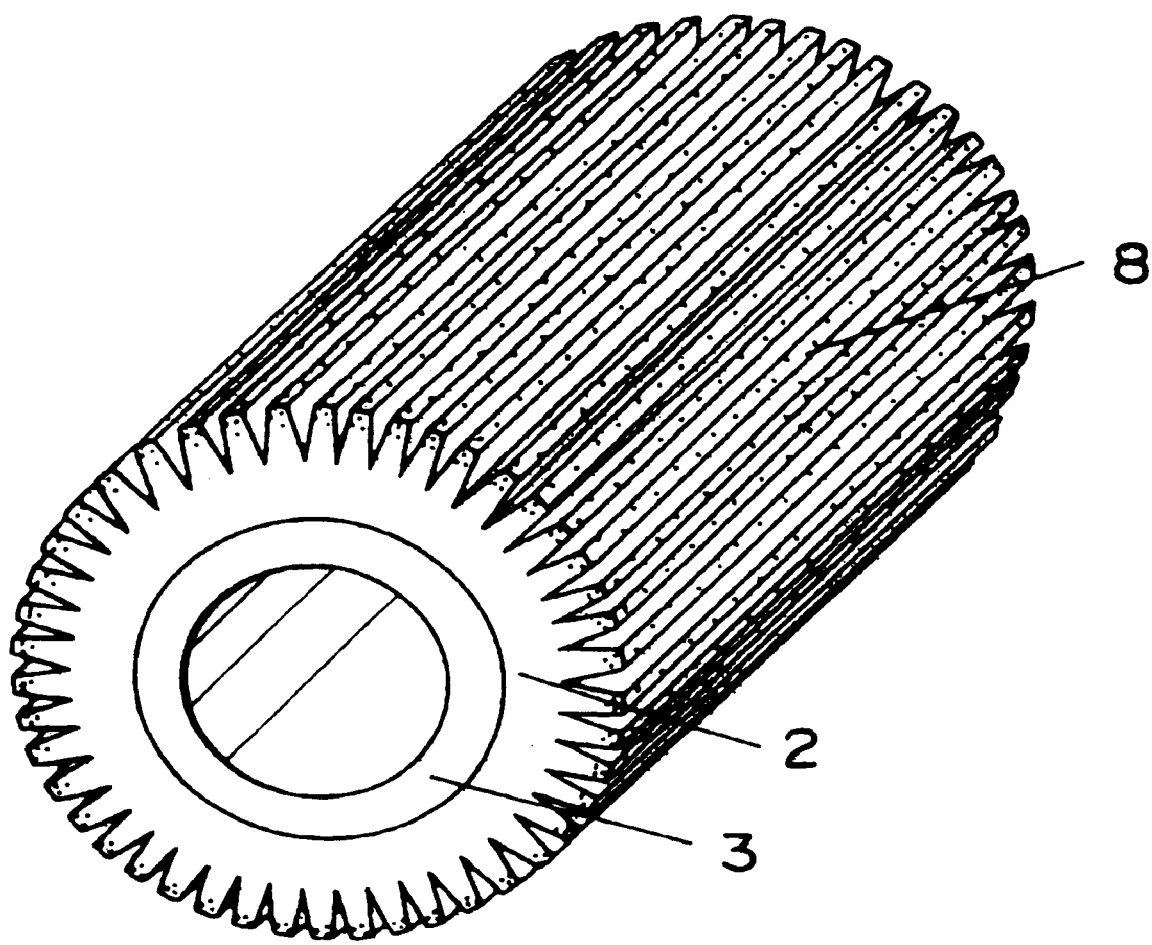

With the method shown in FIGS. 4 to 6, the radially outwardly protruding crests through which the head cleaner contacts the magnetic recording and/or reproducing heads can be formed simply and conveniently, with the crests exhibiting the abrading capability. It is to be noted that, although the cut lines are formed so as to extend in a direction parallel to the spindle 3 or in a direction transverse to the oblong web of soft material, they may be formed slantwise in one surface of the oblong web of soft material so that the resultant crests can extend helical relative to the rotary roller 1. It is also to be noted that although the illustrated method shows only one soft member 2 being manufactured, the use may be made of a relatively large web of soft material sufficient to provide a tube of soft material which may eventually cut into a plurality of pieces each corresponding to the single soft member 2.

Figure 7:
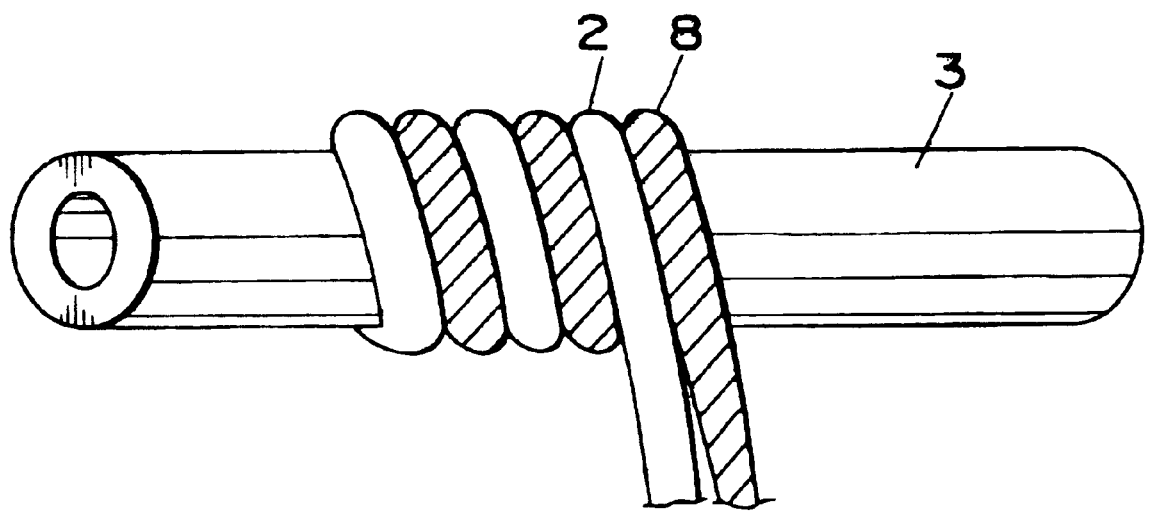
FIGS. 7 and 8 are schematic perspective view showing sequential steps of manufacture of the head cleaner shown in FIG. 2, respectively.

The head cleaner according to the second embodiment of the present invention shown in and described with reference to FIG. 2 can be manufactured in a manner shown in FIGS. 7 and 8. At the outset, two ribbons of a sponge material, both 1 mm in width, are prepared and one of the sponge ribbons is impregnated with the abrasive material containing particles of red iron oxide of 0.8 $\mu$m in average particle size mixed with the binder. As shown in FIG. 7, the two ribbons are spirally turned around and bonded to a length of rigid tubing, which eventually form the spindle 3, in such a manner that turns of the ribbon not impregnated with the abrasive material and the turns of the ribbon impregnated with the abrasive material can alternate with each other over the length of the tubing. After an adhesive material used to fixedly secure the ribbons to the length of rigid tubing has been cured or hardened, the length of rigid tubing having the spiral and alternating turns of the ribbons is cut into a plurality of pieces each having a required length to eventually provide a plurality of head cleaners as shown in FIG. 8.

Figure 8:
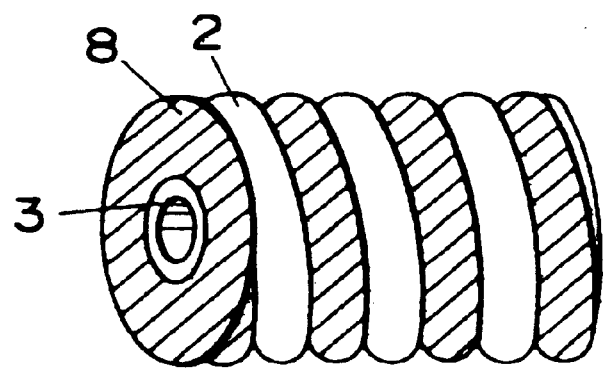

According to the method shown in FIGS. 7 and 8, different materials can easily and conveniently be combined to make the head cleaners of the present invention. The kind of the abrasive material to be impregnated may be altered amidst the manufacture.

Although in the foregoing description made with reference to FIGS. 7 and 8 the material impregnated with the abrasive material has been used so that the soft member 2 can have an abrading capability, the sponge material pre-impregnated with the abrasive material or a brush-like material having an abrading capability may be employed. Also, although the rotary roller 1 has been shown and described as prepared from the use of the two ribbons, the abrasive material may be partly impregnated only in one of them, or a combination of materials having an abrading capability and having no abrading capability or a combination of materials having different abrading capabilities may be employed to form the rotary roller 1.

1st Embodiment of Magnetic Recording/Reproducing Apparatus

Figure 9:
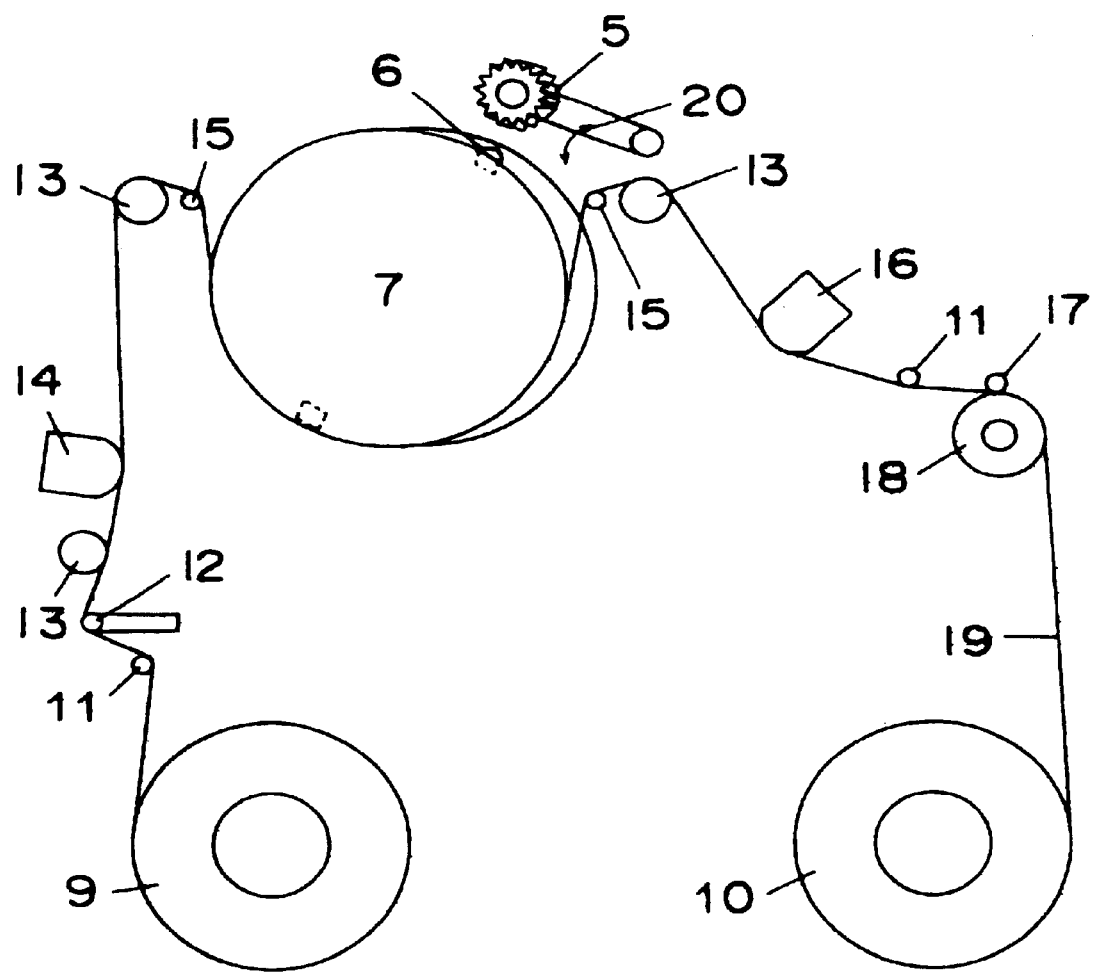
FIG. 9 is a schematic diagram showing a video tape recorder utilizable in the practice of the present invention.

FIG. 9 illustrates a popular tape transport system employed in the conventional video tape recorder operating on the VHS scheme. The video tape recorder shown therein makes use of the head cleaner 5 manufactured in accordance with the present invention. The tape transport system shown therein includes a plurality of, for example, two, magnetic recording and/or reproducing heads 6 carried by a rotary head-carrier drum 7 for rotation together therewith, a tape supply reel 9, a tape take-up reel 10, a guide post 11, a tension regulator 12, a rotary post 13, an eraser head 14, inclined guide posts 15, a sound control head 16, a capstan 17 and a pinch roller 18 cooperable with the capstan 17 to feed a length of magnetic tape 19 from the supply reel 9 towards the take-up reel 10 via the rotary head-carrier drum 7. Arrangement of those component parts of the video tape recorder is well known to those skilled in the art and will not therefore be described for the sake of brevity.

As is well known to those skilled in the art, during the video tape recorder being operated with the length of magnetic tape 19 running from the supply reel 9 towards the take-up reel 10 via the rotary head-carrier drum 7, a portion of the length of magnetic tape 19 adjacent the rotary head-carrier drum 7 is urged by the inclined guide posts 15 to contact the outer peripheral surface of such drum 7 so that the magnetic heads 6 can scan the length of magnetic tape 19 to pick up video and audio signals from the length of magnetic tape 19. The support arm 4 carrying the head cleaner 5 is supported for pivotal movement between operative and inoperative positions in a direction shown by the arrow 20. The support arm 4 is brought to the operative position with the head cleaner 5 consequently brought in position to contact the angularly moving magnetic heads 6 to remove foreign matter sticking thereto, when a tape cartridge containing the length of magnetic tape 19 is inserted into the video tape recorder and when the tape cartridge is to be ejected from the video tape recorder. In addition, the support arm 4 is programmed to be moved to the operative position when an output from any one of the magnetic heads being monitored is detected as lowering.

The use of the head cleaner of the present invention in the video tape recorder is advantageous in that not only can the foreign matter adhering to the magnetic heads be removed easily, but also the brown stain sticking stubbornly to the magnetic heads can be satisfactorily removed, thereby enabling the video tape recorder to perform a stabilized information recording or reproduction.

A specific manner by which the support arm 4 can be selectively moved between the operative and inoperative positions will now be described with particular reference to FIG. 10.

Figure 10:
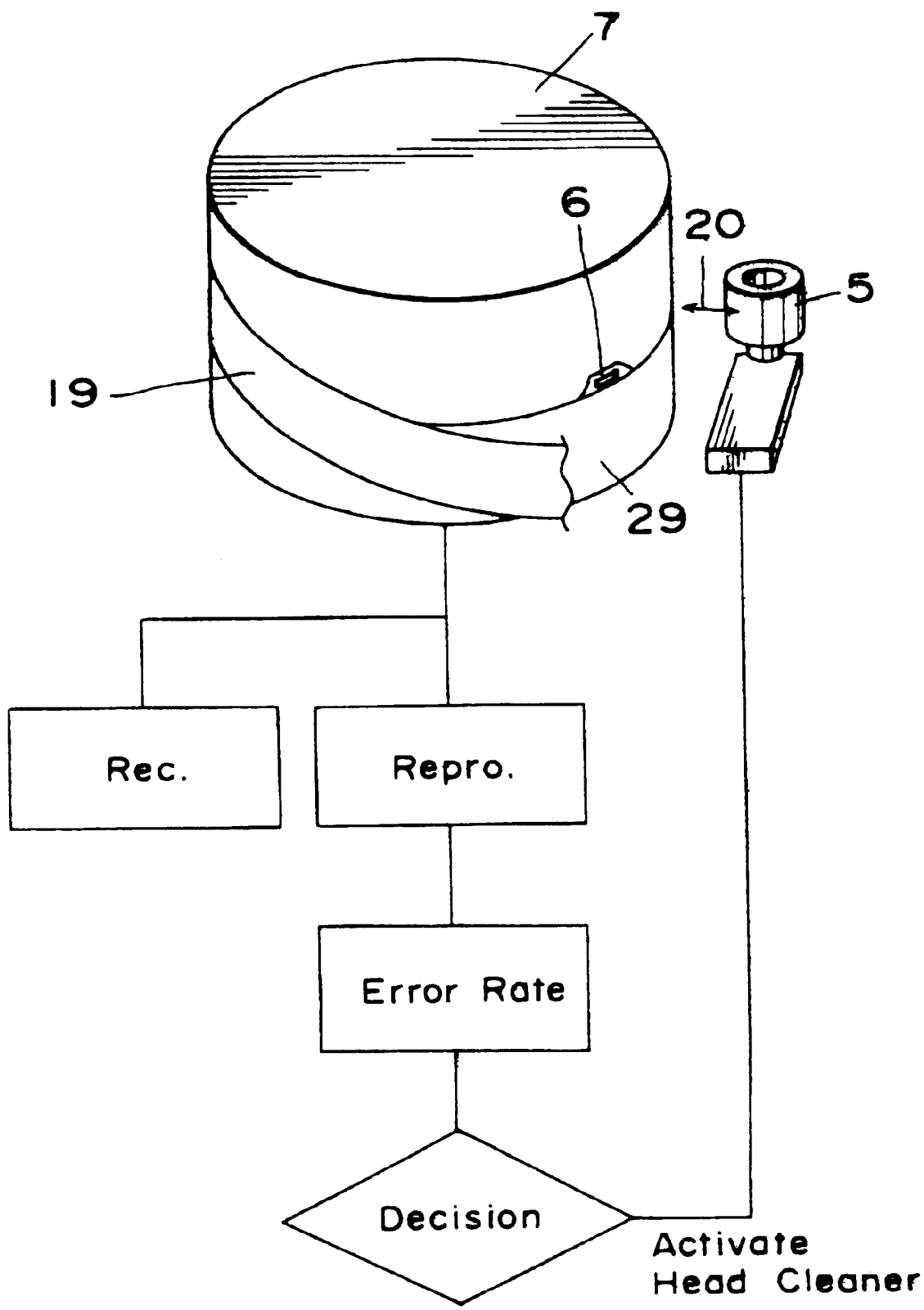
FIG. 10 is a schematic diagram showing a block circuit for activating the head cleaner.

With reference to a block circuit shown in FIG. 10 for activating the head cleaner 5, i.e., for controlling movement of the support arm 4 between the operative and inoperative positions, an error rate is detected from a signal picked up by the rotary magnetic heads, followed by a decision step at which it is determined if the detected error rate is of a value higher than a predetermined value. Should the detected error rate exceed the predetermined value, the support arm 4 is moved from the inoperative position to the operative position to bring the head cleaner 5 into sliding contact with the rotary magnetic heads then undergoing the circular motion.

Where the circuit shown in FIG. 10 is employed in the magnetic recording and/or reproducing apparatus in combination with the head cleaner in accordance with the present invention, when the reproduced output is lowered as a result of the presence of brown stain sticking to the rotary magnetic heads, the foreign matter can effectively and efficiently removed by the head cleaner then brought to the operative position, making it possible to provide a highly reliable magnetic recording and/or reproducing apparatus.

It is to be noted that although in describing the circuit shown in FIG. 10 the head cleaner has been described as activated when the detected error rate exceeds the predetermined value, arrangement may be made so that the head cleaner can be activated at the time of insertion or ejection of the tape cartridge into or from the apparatus and/or at the time of loading or unloading of the tape cartridge relative to the rotary head-carrier drum. It is also to be noted that, considering that the brown stain adhering to the rotary magnetic head generally occur at low temperature and humidity, arrangement may also be made so that the head cleaner can be activated upon detection of a low temperature environment.

The head cleaner of the present invention can be utilized in any type of magnetic recording and/or reproducing apparatuses such as, for example, a helical-scan type, a fixed head type and a vertical scan type although reference has been made to the helical-scan magnetic recording and/or reproducing apparatus.

Figure 11:
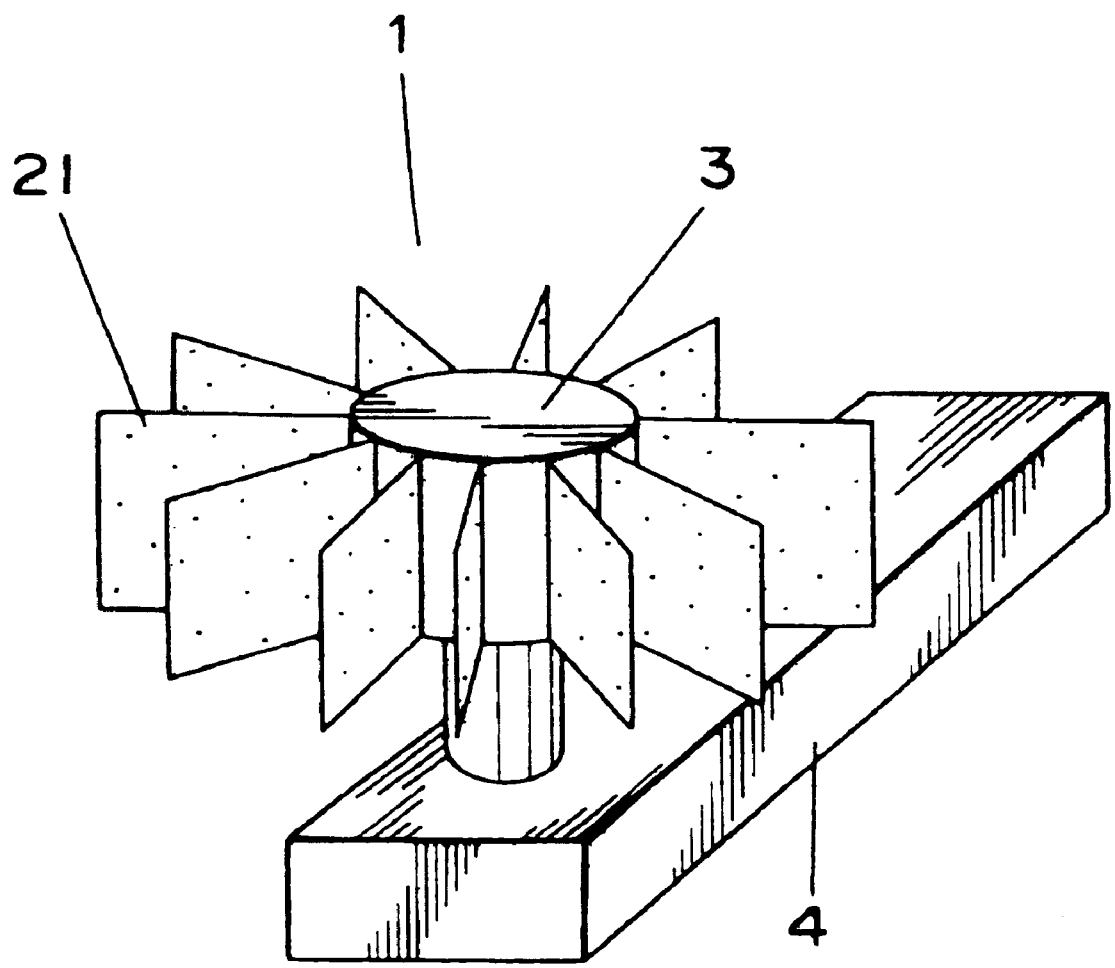
FIG. 11 is a perspective view of the head cleaner according to a fourth preferred embodiment of the present invention.

Fourth Embodiment—FIG. 11

Referring to FIG. 11, there is shown a head cleaner according to a fourth preferred embodiment of the present invention. The head cleaner shown therein comprises a rotary roller 1 including a spindle 3 made of plastics and rotatably mounted on a support arm 4. The roller 1 also includes a plurality of oblong cleaning sheets 21 fitted to the spindle 3 so as to extend radially outwardly therefrom while spaced an equal distance therefrom about the spindle 3.

Each of the cleaning sheets 21 is in the form of an oblong piece of non-woven fabric made of nylon fibers and having only one surface coated with abrasive material, for example, alumina particles of 1 $\mu$m in average particle size. The total thickness of each cleaning sheet 21 is 180 $\mu$m. These cleaning sheets 21 are fitted to the spindle 3 in the manner described above with the abrasive coated surfaces thereof facing in the same direction.

Specifically, each of the cleaning sheets 21 discussed above is prepared in the following manner. A paint containing the abrasive material, and a binder and, optionally, a dispersant and a hardening agent, all sufficiently mixed in a mixer to provide the paint material of a desired ratio of components.

For the abrasive material, one or a mixture of finely divided particles of diamond, finely divided particles of plastics and inorganic ultra-hard microparticles of, for example, $\alpha$-alumina, $\gamma$-alumina, titanium carbide, red iron oxide, chromium oxide, silicon carbide, cerium oxide, titanium carbide, boron carbide, silicon oxide and boron nitride.

The binder mixed the paint may be one or a mixture of fibrous resin such as, for example, nitrocellulose or cellulose acetate butylate, a copolymer of vinyl chloride and vinyl acetate, a vinylidene chloride resin, a polyurethane resin, a polyamide resin, a urea resin, an epoxy resin, a polyester resin, a fluorine resin, an acryl nitrate resin, a phenol resin and some of those derivatives which are chosen in consideration of dispersibility and durability of the resultant coating.

The dispersant that can be optionally utilized may be high-quality fat acid, high-quality fat acid metal salt, high-quality fat acid amide, high-quality alcohol, phosphate ester, glycerin, a silane coupling agent, a titanium coupling agent, an aluminum coupling agent and so on.

The hardening agent which may also optionally be utilized may be polyfunctional low-molecular isocyanate or low-molecular polyamide where thermo-setting is used, or polyfunctional low-molecular polyepoxy where either electron beam hardening or radiant hardening is used. If desired for the purpose of improving reactivity, a cross-linkage suppressor or a cross-linkage accelerator such as, for example, alkaline catalyst, oxide catalyst or a organic tin compound may be added to the hardening agent.

For a solvent, water or a mixed solution of organic solvent such as, for example, methyl ethyl ketone, methyl isobutyl ketone, toluene benzene xylene, cyclohexane, ethyl acetate, butyl acetate, tetrahydrofuran, dimethylformamide, ethyl alcohol, isopropyl alcohol, ethylene chloride and ethyl cellosolve, may be employed.

A mixture of those compositions with the solvent is sufficiently mixed together with the use of a mixer to produce an abrasive paint of a desired ratio of components. The mixer which can be used may be a paint shaker, ball mill, pot mill, dynamill, sand mill, pin mill, pebble mill, stone mill, dizolver, aliter, high-speed mixer, henshell mixer, planetarium mixer, pressure kneader, continuous loader, triple roll mill, dual roll mill, ultrasonic disperser or a disper.

The resultant abrasive paint is applied on a web of non-woven fabric. For this purpose, any suitable painting method may be used in which a doctor blade, gravure roll, reverse roll or kiss roll is used. A spin coating technique or a spray coating technique may also be employed for this purpose. To improve uniformity of a layer of the abrasive paint applied to the web of non-woven fabric, a smoother in the form of, for example, a bar smoother, a wire smoother or a film smoother may be contacted to the abrasive layer.

The web of non-woven fabric having the abrasive paint applied thereon is subsequently cut into pieces each corresponding to the abrasive sheet 21.

Compositions of the particular abrasive paint prepared is listed below:

| | |
|---|---|
| 1 $\mu$m alumina particles: | 3 wt % |
| Polyurethane resin: | 4 wt % |
| Nitrocellulose | 4 wt % |
| Methyl ethyl ketone | 44 wt % |
| Toluene | 45 wt % |

Figure 12:
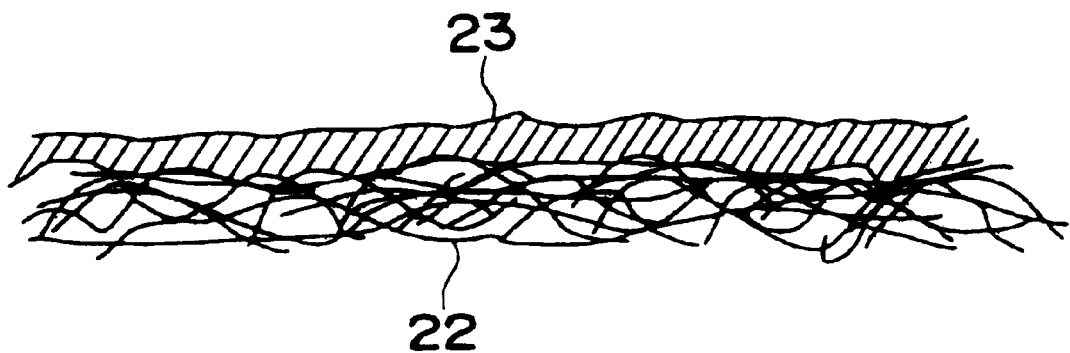
FIG. 12 is a schematic side sectional representation of a web of non-woven fabric used to form the head cleaner shown in FIG. 11.
Figure 13:
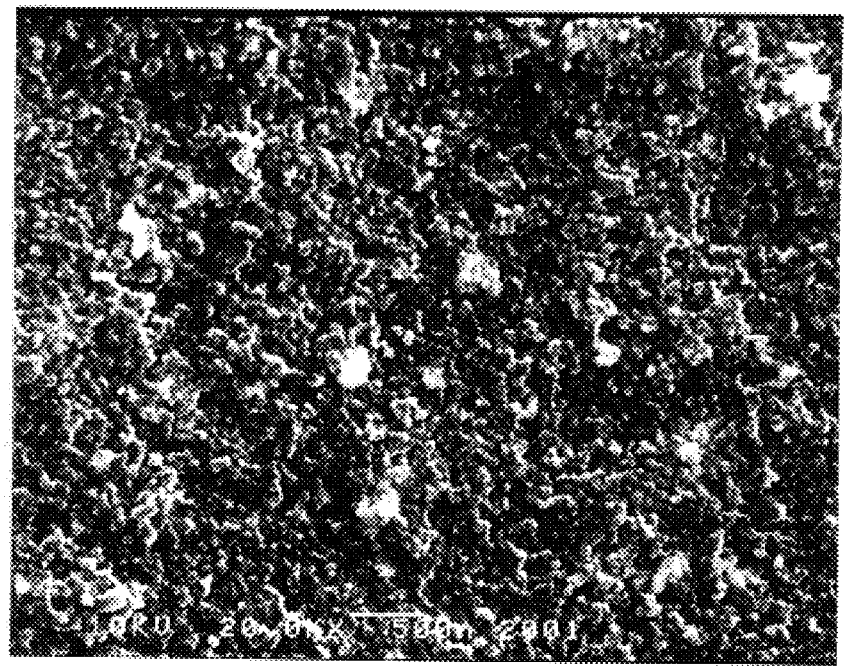
FIG. 13 is a microphotograph of the web of non-woven fabric shown in FIG. 12.
Figure 15:
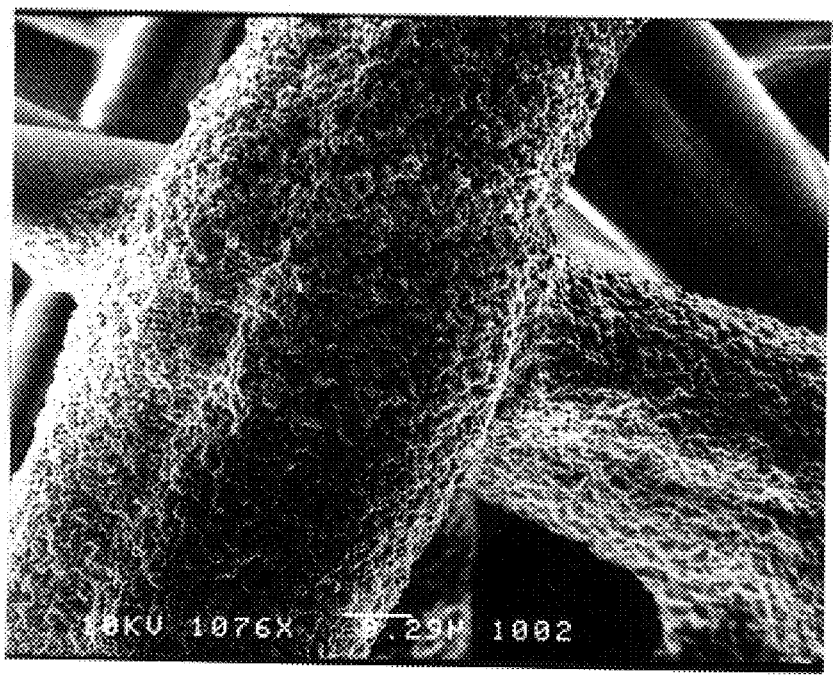
FIG. 15 is a microphotograph of the web of non-woven fabric shown in FIG. 14.

The abrasive paint of the above composition was mixed for 10 hours in a sand mill and then filtered through a filter capable of passing only particles of 2 $\mu$m in particle size. The filtered abrasive paint was subsequently applied on one surface of the web of non-woven nylon fabric to render each cleaning sheet to have a total thickness of 100 $\mu$m, by the use of a doctor blade to form a layer of abrasive paint of 4 $\mu$m in thickness and finally dried to provide a jumbo roll of the non-woven nylon fabric. FIG. 12 shows a transverse sectional representation of the non-woven nylon fabric with the abrasive paint applied thereon. As shown therein, the abrasive material 23 is substantially uniformly fixed on the non-woven fabric 22. A microphotograph of the surface of the abrasive layer on the non-woven fabric obtained by the use of an electron microscope is shown in FIG. 13.

Figure 14:
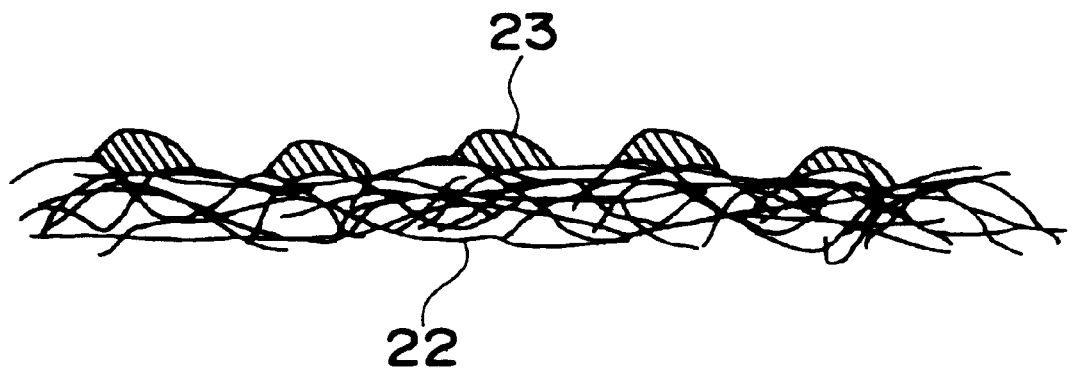
FIG. 14 is a schematic side sectional representation of another web of non-woven fabric which may be used to form the head cleaner shown in FIG. 11.

While in the foregoing the doctor blade was used to paint the abrasive paint to the web of non-woven fabric, a gravure roll may be employed for the same purpose. Where the gravure roll is used, the abrasive material 23 can be distributed on the web of non-woven fabric in a manner substantially shown in FIG. 14. A microphotograph of the surface of the abrasive layer on the non-woven fabric obtained by the use of an electron microscope is shown in FIG. 14.

The abrasive particles which can be used to form the head cleaner of the present invention are of a kind having a particle size not greater than 25 $\mu$m and preferably not greater than 2 $\mu$m. If the particle size is excessively great, surfaces of the magnetic heads and the surface of the rotary head-carrier drum would be susceptible to traces of abrasion.

When the head cleaner of the structure according to the fourth embodiment of the present invention is used, i.e., is brought in position with the rotary roller 1 held in sliding contact with the rotary magnetic heads, foreign matter sticking to the rotary magnetic heads can be removed by the abrasive surfaces of the cleaning sheets 21 and the removed foreign matter is then trapped by the non-woven fabric forming the cleaning sheets 21 to thereby minimize re-adherence of the once-removed foreign matter to the rotary magnetic heads. Also, since as compared with the prior art cylindrical cleaner surface, the cleaning sheets 21 assuredly contact the rotary magnetic heads, a higher cleaning efficiency can be appreciated.

If the direction of rotation of the rotary head-carrier drum is changed when the head cleaner according to the fourth embodiment of the present invention is to be activated, the rotary magnetic heads can be brought into sliding contact with either the abrasive surfaces of the cleaning sheets 21 or with the non-abrasive surfaces of the cleaning sheets 21. In other words, with the head cleaner according to the fourth embodiment of the present invention, either the abrasive surfaces or the non-abrasive surfaces of the cleaning sheets 21 can be selectively utilized depending on the kind of foreign matter adhering to the rotary magnetic heads.

It is to be noted that the non-woven fabric forming the cleaning sheets 21 may not be always limited to that made of nylon, but non-woven fabric of Kevlar fibers or polyester fibers can be equally utilized for the cleaning sheets 21.

Figure 16:
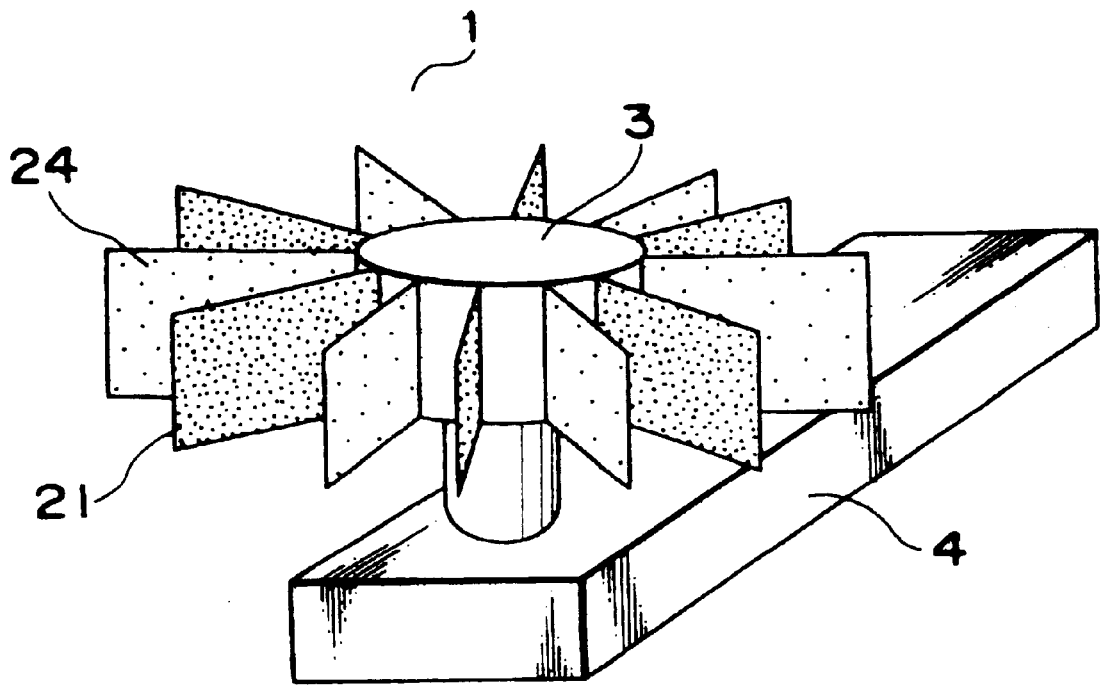
FIGS. 16 to 22 are schematic perspective views of the head cleaner according to fifth to eleventh preferred embodiments of the present invention, respectively.

Fifth Embodiment—FIG. 16

The head cleaner according to a fifth preferred embodiment of the present invention is shown in FIG. 16 and is substantially similar to that shown in FIG. 11. However, in the practice of the fifth embodiment of the present invention, each of the oblong cleaning sheets 21 is in the form of an oblong web of non-woven fabric made of nylon fibers and having its opposite surfaces coated with alumina particles of 0.5 $\mu$m in particle size to render each cleaning sheet 21 to have a total thickness of 200 $\mu$m. In combination with the cleaning sheets 21, oblong non-woven fabric pieces 24 are also employed, and the cleaning sheets 21 and the non-woven fabric pieces 24 are fitted to the plastic spindle 3 so as to alternate with each other around the spindle 3 and also as to extend radially outwardly therefrom while spaced an equal distance therefrom about the spindle 3.

According to the fifth embodiment of the present invention, when the rotary roller 1 is brought into contact with the rotary magnetic heads, the cleaning sheets 21 having an abrading capability and the non-woven fabric pieces 24 alternately contact the rotary magnetic heads and, therefore, the foreign matter sticking to the rotary magnetic heads is first removed by the cleaning sheets 21 and is then trapped by the non-woven fabric pieces 24 to thereby minimize re-adherence of the once-removed foreign matter to the rotary magnetic heads. Also, since both of the cleaning sheets 21 and the non-woven fabric pieces 24 are of a soft nature, there is no substantial possibility of the rotary head-carrier drum being damaged.

Figure 17:
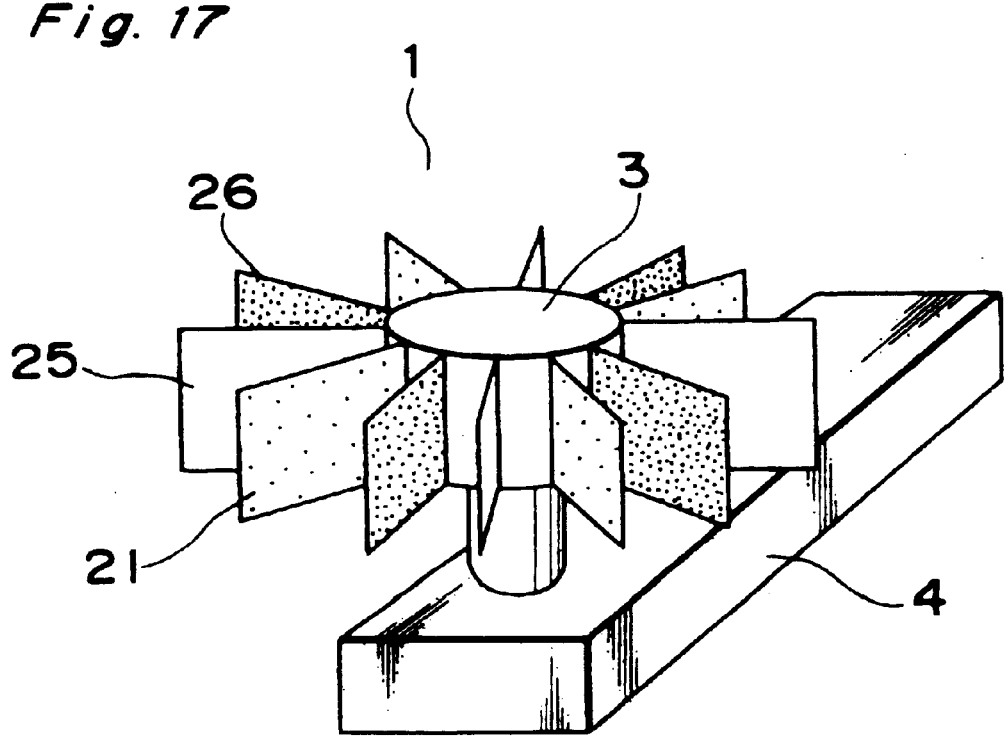

Sixth Embodiment—FIG. 17

The head cleaner according to a sixth preferred embodiment of the present is also similar to that according to the fourth embodiment shown in FIG. 11. However, in this embodiment, three types of oblong cleaning sheets 21, 25 and 26 are employed and are secured to the plastic spindle 3 so as to alternate with each other around the spindle 3 and also as to extend radially outwardly therefrom while spaced an equal distance therefrom about the spindle 3.

Each of the oblong cleaning sheets 21 is in the form of an oblong web of non-woven fabric made of nylon fibers and having one surface thereof coated with alumina particles of 0.5 μm in particle size. Each of the cleaning sheets 25 is in the form of an oblong web of non-woven fabric made of nylon fibers and having one surface thereof coated with alumina particles of 1 μm in particle size. Each of the cleaning sheets 26 is in the form of an oblong web of non-woven fabric made of nylon fibers and having one surface thereof coated with alumina particles of 1.5 μm in particle size. By way of example, each of the cleaning sheets 22, 25 and 26 has a total thickness of 200 μm.

According to the sixth embodiment of the present invention, when the rotary roller 1 is brought into contact with the rotary magnetic heads, the cleaning sheets 21, 25 and 26, having different abrading capabilities alternately contact the rotary magnetic heads and, therefore, the foreign matter sticking to the rotary magnetic heads can be efficiently removed from the rotary magnetic heads. Also, by collecting the removed foreign matter, since both of the cleaning sheets 21 and the non-woven fabric pieces 24 are the possibility of the removed foreign matter re-adhering to the rotary magnetic heads can be avoided.

Although in the foregoing sixth embodiment of the present invention the use has been made of the abrasive particles of different particle sizes having different abrading capabilities, the cleaning sheets made of Kevlar fibers and/or metallic fibers and having an abrading capability may be employed. Also, sheet-like non-woven fabric pieces having no abrasive particle applied thereto may be employed in a manner substantially similar to those described with reference to FIG. 16.

Figure 18:
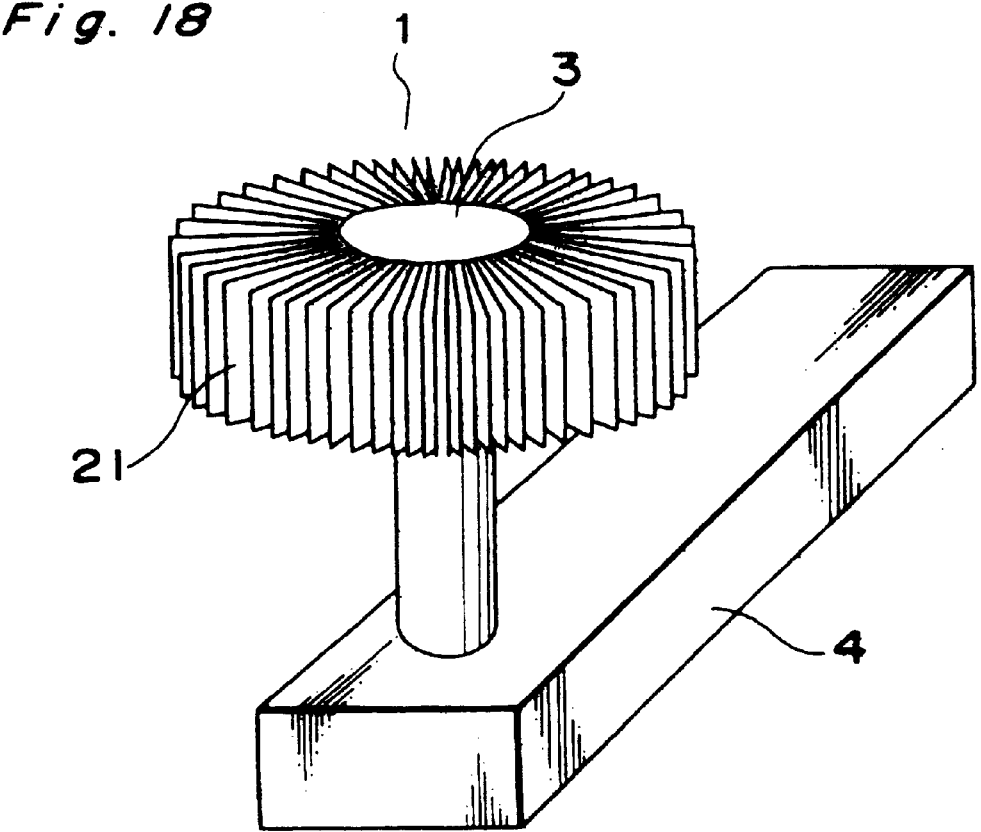

Seventh Embodiment—FIG. 18

The head cleaner according to a seventh preferred embodiment of the present is also similar to that according to the fourth embodiment shown in FIG. 11. However, in this embodiment, the cleaning sheets 21, 170 μm in total thickness, are in the form of an oblong web of non-woven fabric made of nylon fibers intertwined with Kevlar fibers and are fixedly fitted to the plastic spindle 3 so as to extend radially outwardly therefrom while spaced an equal distance therefrom about the spindle 3. The number of the cleaning sheets 21 employed in the practice of the seventh embodiment of the present invention is about 100.

According to the seventh embodiment of the present invention, when the rotary roller 1 is brought into contact with the rotary magnetic heads, the cleaning sheets 21 successively contact the rotary magnetic heads and, the Kevlar fibers having an abrading capability and intertwined with the nylon fibers in the cleaning sheets 21 remove and then trap the foreign matter sticking to the rotary magnetic heads. Therefore, the cleaner head shown in FIG. 18 is advantageous in that any possible re-adherence of the once-removed foreign matter back to the rotary magnetic heads can be substantially eliminated.

Figure 19:
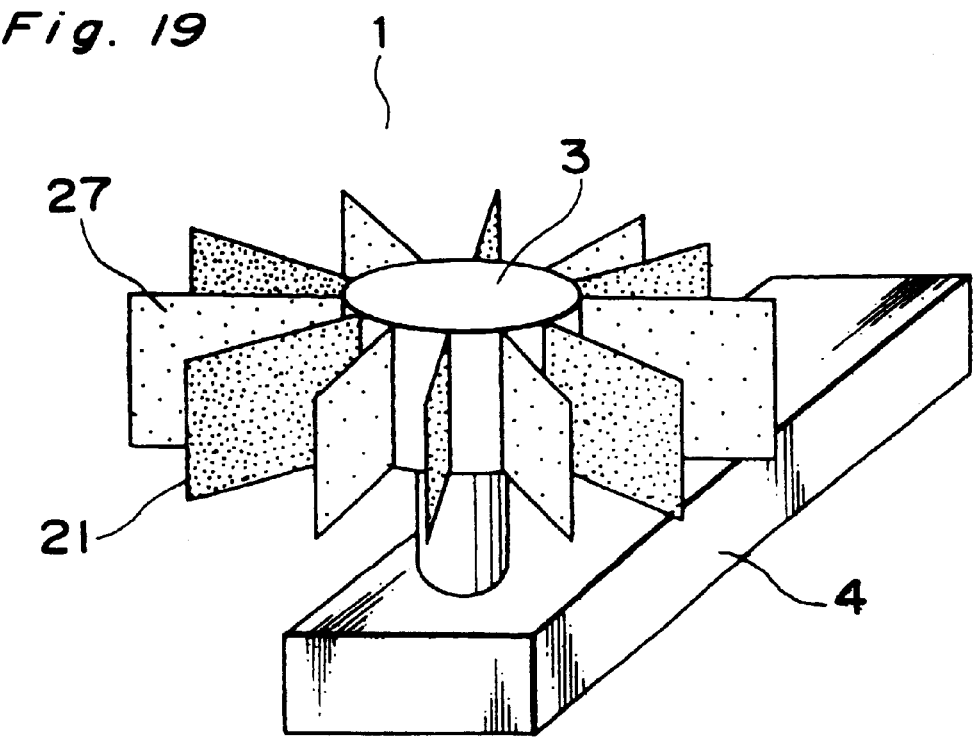

Eighth Embodiment—FIG. 19

Referring now to FIG. 19, there is shown a cleaner head according to an eighth preferred embodiment of the present invention which is substantially similar to that shown in FIG. 11. However, in this embodiment, in addition to the cleaning sheets 21 in the form of an oblong web, 180 μm in total thickness, of non-woven polyester fibers, abrasive tapes 27 are also employed and these cleaning sheets 21 and abrasive tapes 27 are fixedly secured to the plastic spindle 3 so as to alternate with each other around the spindle 3 and also as to extend radially outwardly therefrom while spaced an equal distance therefrom about the spindle 3.

Each of the cleaning sheets 21 used therein is in the form of a web of non-woven fabric, 180 μm in total thickness, made of polyester fibers. On the other hand, each of the abrasive tapes 27 is graded #15,000 having a total thickness of 25 μm.

According to the eighth embodiment of the present invention, when the rotary roller 1 is brought into contact with the magnetic heads, the cleaning sheets 21 having an abrading capability and the abrasive tapes 27 alternately contact the magnetic heads. Therefore, foreign matter sticking to the rotary magnetic head is first removed by the abrasive tapes 27 and then collected by the cleaning sheets 21, exhibiting a high cleaning effect to remove the foreign matter stubbornly sticking to the magnetic heads, accompanied by elimination of the possibility of re-adherence of the once-removed foreign matter back to the magnetic heads.

Figure 20:
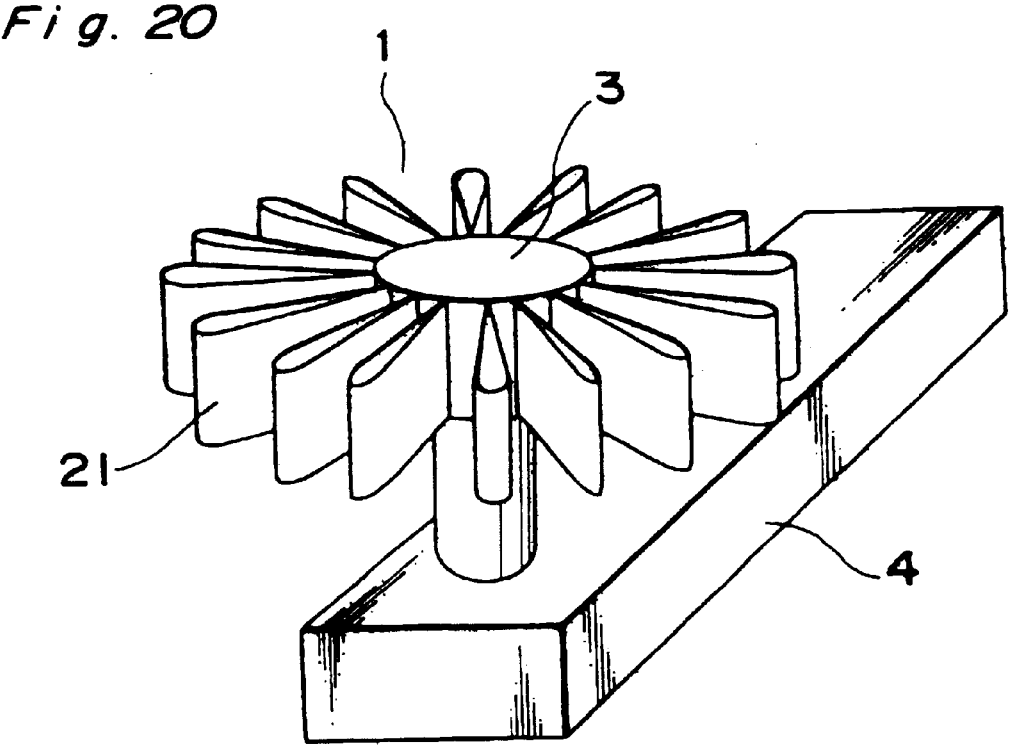

Ninth Embodiment—FIG. 20

Referring to FIG. 20, there is shown a head cleaner according to a ninth preferred embodiment of the present invention. The head cleaner shown therein comprises a rotary roller 1 including a spindle 3 made of plastics and rotatably mounted on a support arm 4. The roller 1 also includes a plurality of cleaning sheets 21 fitted to the spindle 3 so as to extend radially outwardly therefrom while spaced an equal distance therefrom about the spindle 3.

Each of the cleaning sheets 21 has a total thickness of 150 μm and is in the form of a ribbon of non-woven fabric made of, for example, nylon fibers and having one surface coated with alumina particles of 1 μm in particle size. The ribbon of non-woven fabric is then folded back, with the coated surface thereof oriented outwardly, along a transverse line intermediate of the length of the non-woven fabric ribbon with its opposite end portions overlapping one above the other and is then fixedly secured to the spindle 3.

According to the ninth embodiment of the present invention, when the rotary roller 1 is brought into contact with the rotary magnetic heads, a high cleaning efficiency can be obtained because the cleaning sheets 21 have a resiliency and because bent portions of the respective cleaning sheets 21 are first brought into contact with the rotary magnetic heads. In addition, the abrasive-coated surfaces of the cleaning sheets 21 when the latter are in contact with the rotary magnetic heads remove foreign matter sticking to the rotary magnetic head and the fibers forming the non-woven fabric of the cleaning sheets 21 traps the foreign matter so removed, thereby avoiding the possibility of the once-removed foreign matter re-adhering to the rotary magnetic heads.

Figure 21:
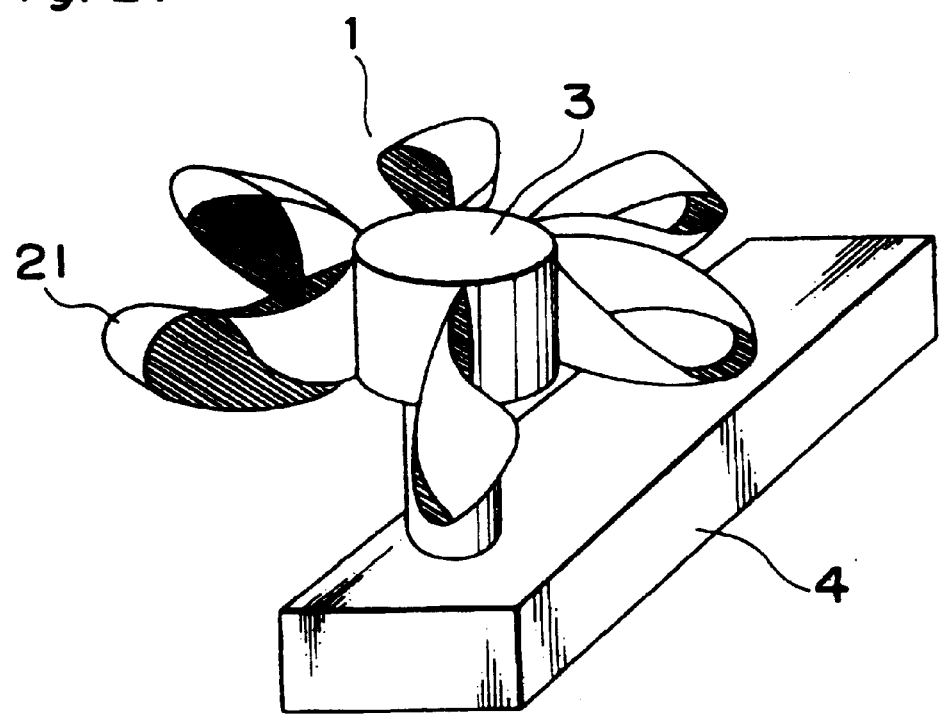

Tenth Embodiment—FIG. 21

The head cleaner shown according to a tenth preferred embodiment of the present invention shown in FIG. 21 is substantially similar to that according to the previously discussed embodiment shown in FIG. 20. However, in place of the alumina particles of 1 μm in particle size, the tenth embodiment makes use of the alumina particles of 1.5 μm in particle size are coated on one surface of each of the ribbons of non-woven nylon fabric to render each ribbon to have a total thickness of 170 μm, to complete the respective cleaning sheet 21.

In addition, in the embodiment shown in FIG. 21, when each cleaning sheets 21 is to be secured to the spindle 3 so as to extend radially outwardly therefrom, the associated ribbon of non-woven nylon fabric is twisted so that, when such ribbon is folded backwards, one end of the abrasive-coated surface thereof is brought in overlapping relation with and is then bonded to the opposite end of the opposite, that is, non-coated surface thereof.

According to the tenth embodiment of the present invention, when the rotary roller 1 is brought into contact with the rotary magnetic heads, a high cleaning efficiency can be obtained because the cleaning sheets 21 have a resiliency and because bent portions of the respective cleaning sheets 21 which are first brought into contact with the rotary magnetic heads are twisted. In addition, the abrasive-coated surfaces of the cleaning sheets 21 when the latter are in contact with the rotary magnetic heads remove foreign matter sticking to the rotary magnetic head and the fibers forming the non-woven fabric of the cleaning sheets 21 traps the foreign matter so removed, thereby avoiding the possibility of the once-removed foreign matter re-adhering to the rotary magnetic heads. Moreover, since the contact surfaces have an elasticity, they contact the rotary magnetic head softly.

Figure 22:
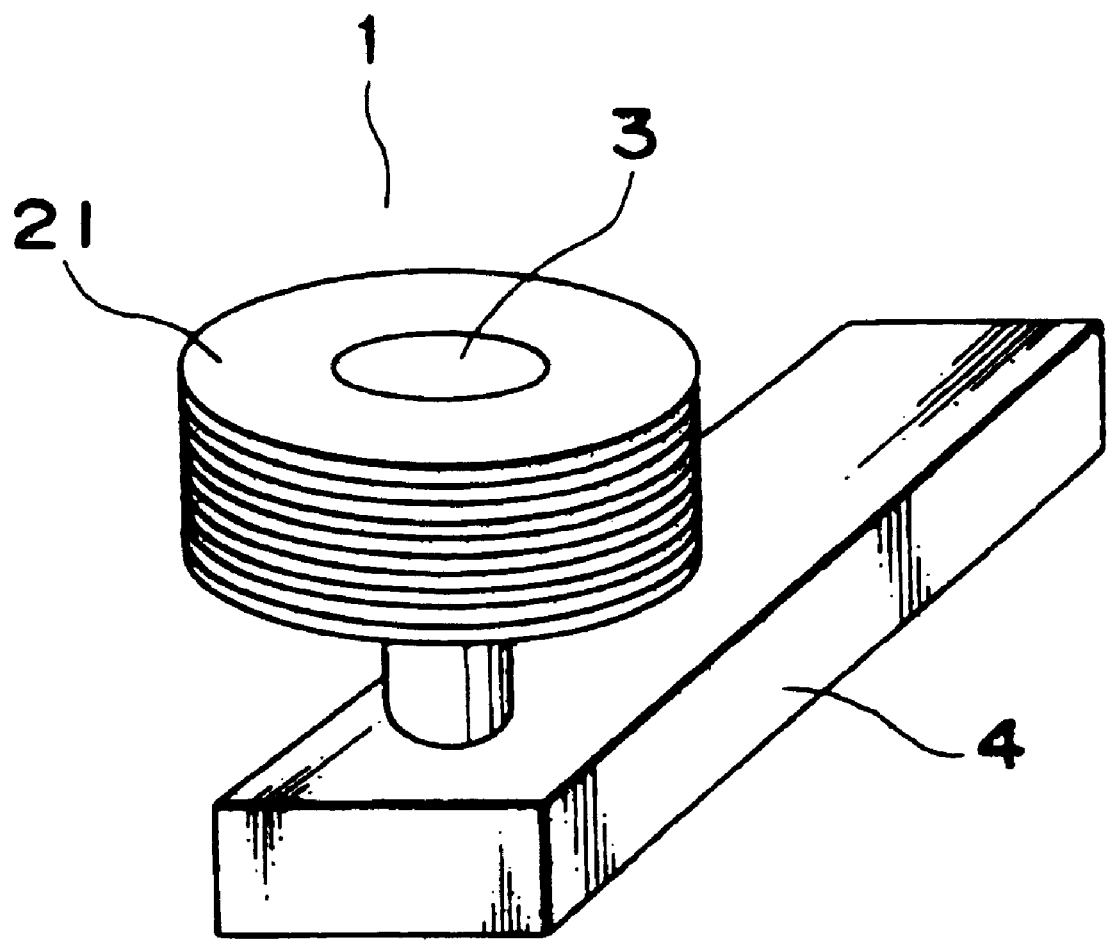

Eleventh Embodiment—FIG. 22

FIG. 22 illustrates a head cleaner according to an eleventh preferred embodiment of the present invention. In this embodiment, the head cleaner comprises a rotary roller 1 including a spindle 3 made of plastics and rotatably mounted on a support arm 4. The roller 1 also includes a stack of annular cleaning sheets 21 fixedly mounted on the spindle 3 in coaxial relation so as to lie in a plane perpendicular to the spindle 3.

Each of the cleaning sheets 21 has a total thickness of 200 $\mu$m and is in the form of an annular sheet of non-woven fabric made of, for example, nylon fibers and having one surface coated with alumina particles of 0.5 $\mu$m in particle size.

According to this tenth embodiment of the present invention, when the rotary roller 1 is brought into contact with the rotary magnetic heads, the coaxially layered cleaning sheets 21 deform to conform to the shape of the rotary magnetic heads so that portions of the sheets having no abrading capability and portions of the sheets having an abrading capability can be randomly brought into contact with the rotary magnetic heads and, therefore, the foreign matter sticking to the rotary magnetic head can be effectively and efficiently removed.

2nd Embodiment of Magnetic Recording/Reproducing Apparatus

Figure 23:
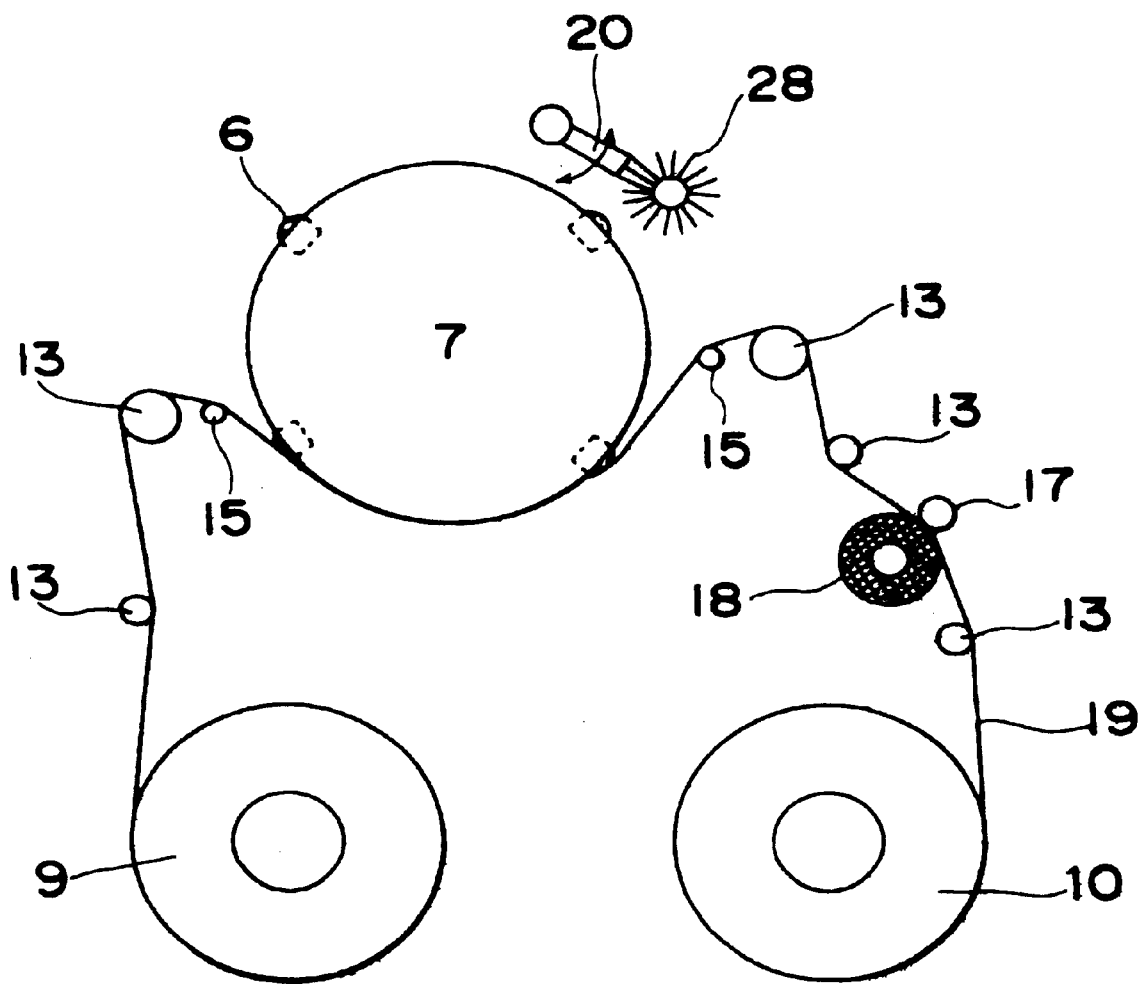
FIG. 23 is a schematic diagram showing a digital data storage device utilizable in the practice of the present invention.

The magnetic recording and/or reproducing apparatus shown in FIG. 23 is a digital data storage (DDS) device. This digital data storage device includes a tape transport system. The digital data storage device shown therein makes use of the head cleaner 28 manufactured in accordance with the present invention and rotatably mounted on a support arm 4 movable between an operative position, in which the head cleaner 28 is brought into contact with the rotary magnetic heads 6, and an inoperative position in which the head cleaner 28 is separated away from the rotary magnetic heads 6. The tape transport system shown therein includes, in addition to the rotary magnetic heads 6, a rotary head-carrier drum 7 for supporting the rotary magnetic heads 6 for rotation together therewith, a tape supply reel 9, a tape take-up reel 10, a rotary post 13, inclined guide posts 15, a capstan 17 and a pinch roller 18 cooperable with the capstan 17 to feed a length of magnetic tape 19 from the supply reel 9 towards the take-up reel 10 via the rotary head-carrier drum 7. Arrangement of those component parts of the digital data storage device is well known to those skilled in the art and will not therefore be described for the sake of brevity.

As is well known to those skilled in the art, during the digital data storage device being operated with the length of magnetic tape 19 running from the supply reel 9 towards the take-up reel 10 via the rotary head-carrier drum 7, a portion of the length of magnetic tape 19 adjacent the rotary head-carrier drum 7 is urged by the inclined guide posts 15 to contact the outer peripheral surface of such drum 7 so that the magnetic heads 6 can scan the length of magnetic tape 19 to pick up or record signals from or on the length of magnetic tape 19. The support arm 4 carrying the head cleaner 28 is supported for pivotal movement between the operative and inoperative positions in a direction shown by the arrow 20. The support arm 4 is brought to the operative position with the head cleaner 28 consequently brought in position to contact the angularly moving magnetic heads 6 to remove foreign matter sticking thereto.

So far shown in FIG. 23, the head cleaner 23 is of a type shown in FIG. 11 wherein the cleaning sheets 21 has only one surface coated with the abrasive material. The head cleaner is generally activated to clean the rotary magnetic heads 6 with the non-coated surfaces of the cleaning sheets 21 held in contact with the rotary magnetic heads 6 at the time of tape loading, unloading or rewinding to thereby minimize adherence of foreign matter to the rotary magnetic heads 6. However, when one or a combination of the error rate, the recording signal and the reproduced signal is reduced because of the brown stain sticking to the rotary magnetic heads 6, the direction of rotation of the rotary head-carrier drum 7 is to be reversed so that the coated surfaces of the cleaning sheets 21 can be brought into contact with the rotary magnetic heads to remove the brown stain from the rotary magnetic heads. By activating the head cleaner in this way, the foreign matter can be effectively and efficiently removed from the rotary magnetic heads with neither the head-carrier drum nor the magnetic head being damaged.

A specific manner by which the support arm 4 can be selectively moved between the operative and inoperative positions will now be described with particular reference to FIG. 24.

Figure 24:
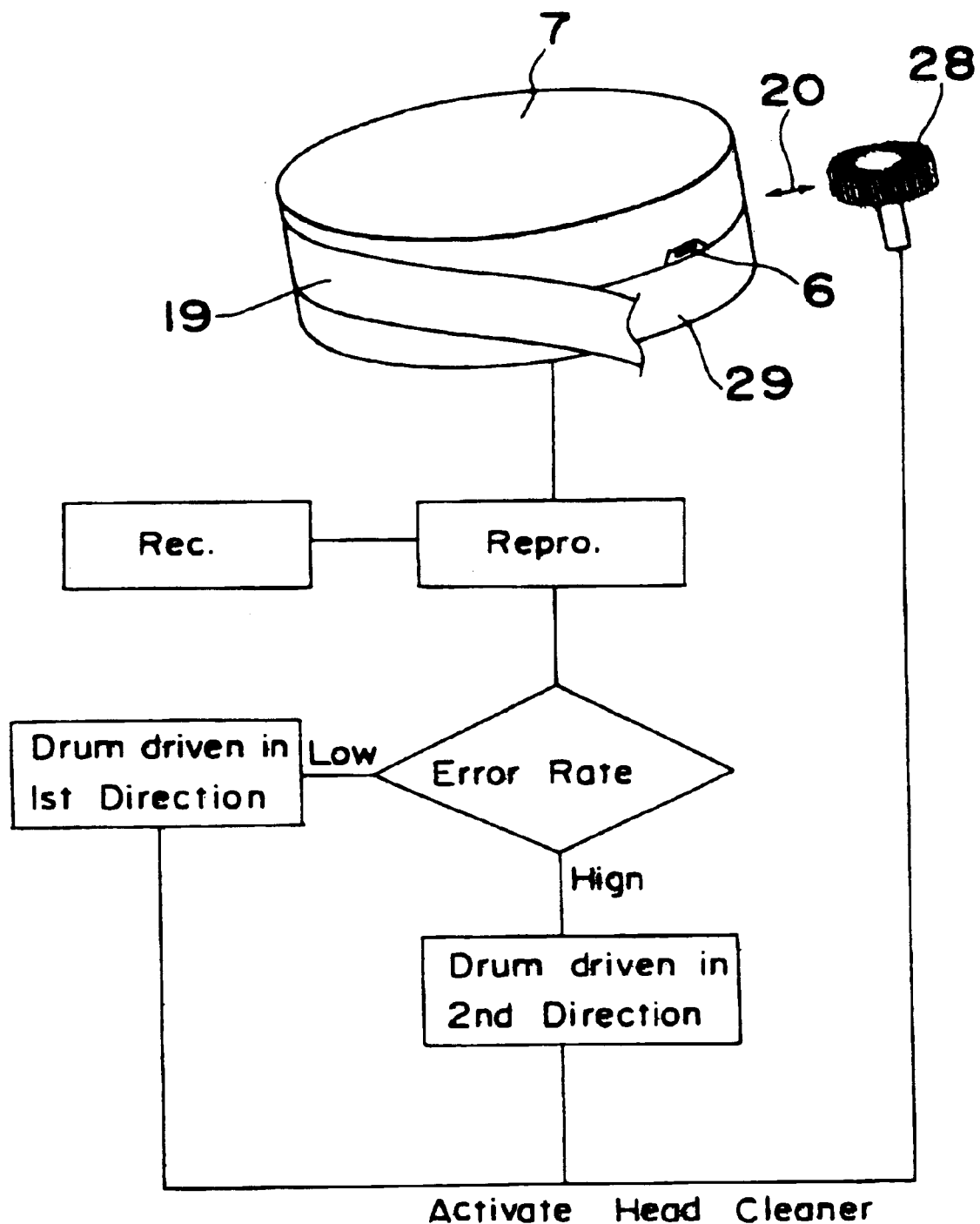
FIG. 24 is a schematic diagram showing a block circuit for activating the head cleaner employed in the digital data storage device of FIG. 23.

It is to be noted that in the example shown in FIG. 24, the rotary head-carrier drum 7 is shown as coaxially mounted above a stationary drum 29 and is reversibly rotatable in one of the opposite directions relative to the stationary drum 29.

It is also to be noted that when the rotary head-carrier drum 7 is driven in a first direction, the non-coated surfaces of the cleaning sheets 21 are successively brought into contact with the rotary magnetic heads whereas when the rotary head-carrier drum 7 is driven in a second direction counter to the first direction, the coated surfaces of the cleaning sheets 21 are successively brought into contact with the rotary magnetic heads.

With reference to a block circuit shown in FIG. 24 for activating the head cleaner 28, i.e., for controlling movement of the support arm 4 between the operative and inoperative positions, an error rate is first calculated detected from a signal picked up by the rotary magnetic heads, followed by a decision step at which it is determined if the detected error rate is of a value higher than a predetermined value. Should the detected error rate is lower than the predetermined value, the rotary head-carrier drum 7 is driven in the first direction with the non-coated surfaces of the cleaning sheets 21 forming the head cleaner 28 consequently brought into contact with the magnetic heads 6. On the other hand, should the detected error rate is higher than the predetermined value, the rotary head-carrier drum is driven in the second direction with the coated surfaces of the cleaning sheets 21 consequently brought into contact with the magnetic heads 6.

Where the circuit shown in FIG. 24 is employed in the magnetic recording and/or reproducing apparatus in combination with the head cleaner in accordance with the present invention, even when the reproduced output is lowered as a result of the presence of brown stain sticking to the rotary magnetic heads, the foreign matter can effectively and efficiently removed by the head cleaner then brought to the operative position, making it possible to provide a highly reliable magnetic recording and/or reproducing apparatus. Otherwise, the non-coated surfaces of the cleaning sheets contact the rotary magnetic heads and, therefore, neither the rotary head-carrier drum 7 nor the rotary magnetic heads 6 may be damaged or scratched.

It is to be noted that although in describing the circuit shown in FIG. 24 the rotary head-carrier drum has been described as driven in the second direction when the detected error rate exceeds the predetermined value, arrangement may be made so that the head cleaner can be activated at the time of insertion or ejection of the tape cartridge into or from the apparatus and/or at the time of loading or unloading of the tape cartridge relative to the rotary head-carrier drum. It is also to be noted that, considering that the brown stain adhering to the rotary magnetic head generally occur at low temperature and humidity, arrangement may also be made so that the head cleaner can be activated upon detection of a low temperature environment. Furthermore, the head cleaner of the present invention can be utilized in any type of magnetic recording and/or reproducing apparatuses such as, for example, a helical-scan type, a fixed head type and a vertical scan type although reference has been made to the helical-scan magnetic recording and/or reproducing apparatus.

Figure 25:
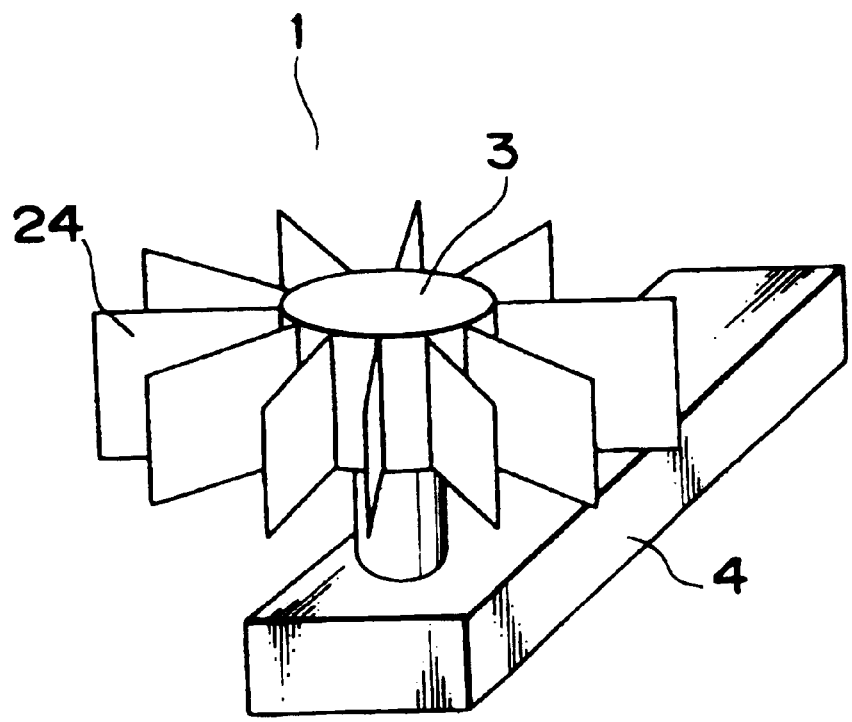
FIGS. 25 to 29 are schematic perspective views of the head cleaner according to twelfth to sixteenth preferred embodiments of the present invention, respectively.

Twelfth Embodiment—FIG. 25

Referring to FIG. 25 showing a twelfth preferred embodiment of the present invention, the head cleaner shown therein comprises a generally roller 1 including a spindle 3 made of, for example, plastics and rotatably mounted on a support arm 4. The roller 1 also includes a plurality of oblong cleaning sheets 24 fitted to the spindle 3 so as to extend radially outwardly therefrom while spaced an equal distance therefrom about the spindle 3. Each of the cleaning sheets 24 has a total thickness of 200 $\mu$m and is in the form of an oblong piece of non-woven fabric made of nylon.

According to this embodiment, when the head cleaner is brought in contact with the rotary magnetic heads, foreign matter sticking to the rotary magnetic heads can be removed by the cleaning sheets 24 and the removed foreign matter is then trapped by the non-woven fabric forming the cleaning sheets 24 to thereby minimize re-adherence of the once-removed foreign matter to the rotary magnetic heads. Also, since as compared with the prior art cylindrical cleaner surface, the cleaning sheets 24 assuredly contact the rotary magnetic heads, a higher cleaning efficiency can be appreciated.

Although reference has been made to the cleaning sheets having a thickness of 200 $\mu$m, it is pointed out that if the thickness of the cleaning sheet is greater, the pressure of contact of the cleaning sheets with the rotary magnetic heads and the rotary head-carrier drum will increase to such an extent as to result in damage to the magnetic heads and also as to increase a load on rotation of the head-carrier drum. Accordingly, the maximum permissible thickness of the cleaning sheets is not greater than 500 $\mu$m. However, if the thickness of the cleaning sheets is too small, a sufficient contact pressure cannot be obtained with the head cleaner consequently failing to provide a satisfactory cleaning effect.

Figure 26:
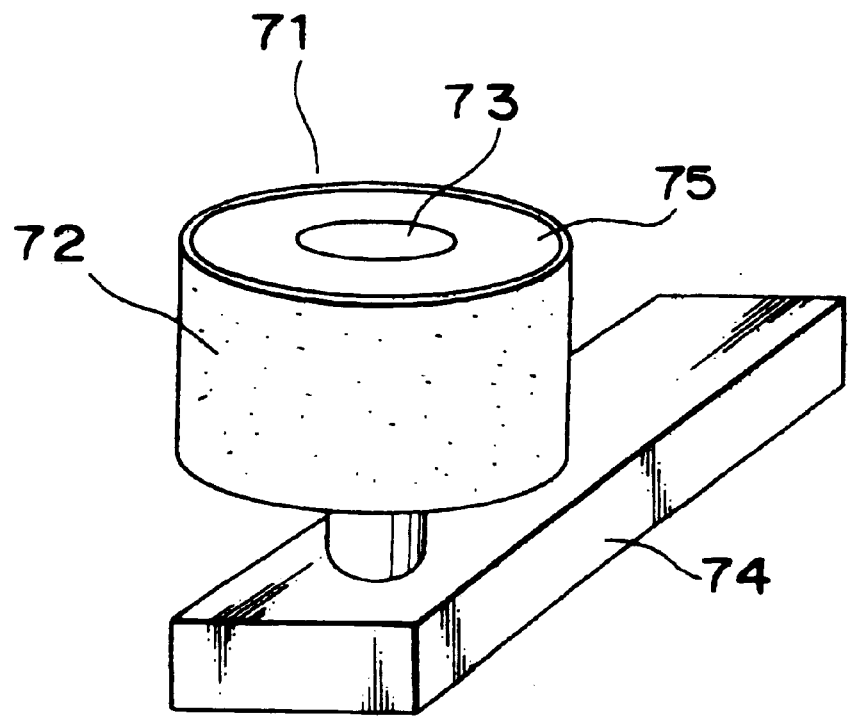

Thirteenth Embodiment—FIG. 26

FIG. 26 illustrates a head cleaner according to a thirteenth preferred embodiment of the present invention. In this embodiment, the head cleaner comprises a rotary roller 71 including a cleaning sheet 72 and a soft member 75 mounted on a spindle 73. The spindle 73 is rotatably mounted on a support arm 74 made of plastics and movable between the operative and inoperative positions. The cleaning sheet 72 is in the form of an oblong web of non-woven fabric, made of nylon fibers of about 15 $\mu$m in fiber diameter, and having one surface coated with alumina particles of 1 $\mu$m to render the cleaning sheet 72 to have a total thickness of 180 $\mu$m. The soft member 75 is in the form of a tube made of, for example, a sponge material and fixedly mounted on the spindle 73. The cleaning sheet 72 is bonded to the outer peripheral surface of the soft member 75 with the coated surface thereof oriented radially outwardly. For bonding the cleaning sheet 72 to the soft member 73, a length of double-sided adhesive tape may be employed which is of a kind free from generation of chlorine gas and organopolysiloxane gas.

According to this embodiment, when the rotary roller 71 is brought into contact with the rotary head-carrier drum 7, the coated surface of the cleaning sheet 72 contact the rotary magnetic heads with a proper elasticity and, therefore, the foreign matter sticking to the rotary magnetic heads can be removed effectively and efficiently. Since for bonding the cleaning sheet 72 around the soft member 75 the double-sided adhesive tape substantially free from generation of chlorine and organopolysiloxane gases is employed, metallic component parts within the apparatus will not be corroded and formation of the brown stain on the rotary magnetic head will not be accelerated.

Also, considering that the slide face of each of the rotary magnetic heads which during operation of the apparatus is brought into sliding contact with the length of magnetic recording and/or reproducing tape has a core width of about 70 $\mu$m, the fibers forming the non-woven fabric utilized to form the cleaning sheet 72 are preferably of a kind having a fiber diameter within the range of 10 to 30 $\mu$m. If the fiber diameter is not greater than 10 $\mu$m, the physical strength of the resultant cleaning sheet 72 will be lowered, but if it is not smaller than 30 $\mu$m, the fibers intertwined to form the non-woven fabric will form so large interstices that the resulting cleaning sheet 72 will fail to wipe foreign matter.

Should the total thickness of the cleaning sheet 72 be not smaller than 500 $\mu$m, the elasticity of the soft member 75 will be adversely affected to such an extent as to cause it to exhibit an unsatisfactory contact with the rotary magnetic heads. Accordingly, the total thickness of the cleaning sheet 72 should be not greater than 500 $\mu$m.

The abrasive particles used should be of a kind having a particle size not greater than 1 $\mu$m. If it is greater than 1 $\mu$m, not only the head-carrier drum, but also the slide faces of the rotary magnetic head will be scratched or otherwise damaged. Considering that abrading of the rotary magnetic heads is generally carried out by the use of an abrasive tape containing abrasive particles of not greater than 1 $\mu$m in particle size, the foreign matter sticking to the rotary magnetic heads can effectively and efficiently removed without giving damage to the rotary magnetic heads if the abrasive particles employed in the cleaning sheet is chosen to be of a kind having a particle size not greater than 1 $\mu$m. A microscopic observation of the surfaces of the rotary magnetic heads and the surface of the head-carrier drum done after the head cleaner according to this embodiment was repeatedly brought into contact with the head-carrier drum 3,000 times for 2 seconds per time while the head-carrier drum was driven at 4,400 rpm, has shown that neither of them were damaged nor scratched.

Comparison of the head cleaner according to this embodiment with the prior art head cleaner was made to determine the cleaning effect. Using two DDS2 drives, one provided with the head cleaner made of a tubular web of non-woven fabric having no abrading capability (hereinafter referred to as a comparison cleaner) and the other provided with the head cleaner according to this embodiment of the present invention, and also using lengths of magnetic recording and/or reproducing tape susceptible to clogging, an endurance test in which information recording and reproduction are repeated was carried at 25° C. with a relative humidity of 20% for 100 hours. Each of the drives were connected with an error monitor to detect the error rate exhibited by any one of the lengths of magnetic recording and/or reproducing tape, and the relevant head cleaner was activated each time the detected error rate was higher than a predetermined value. When no error rate was removed even though the cleaning was effected, arrangement was made to issue an error message so that the relevant drive could be halted.

For about 30 hours subsequent to the start of experiment both of the drives operated, but the drive provided with the comparison cleaner failed to remove the foreign matter sticking to the rotary magnetic heads and was halted because the error rate did not restore. On the other hand, the drive provided with the head cleaner of the present invention operated and, since the foreign matter sticking to the magnetic heads could be removed, the error rate restored and the drive operated further for 100 hours. During this 100 hours, the head cleaner was activated three times and, each time the head cleaner was activated, the error rate restored to accomplish the normal information recording or reproduction.

Figure 27:
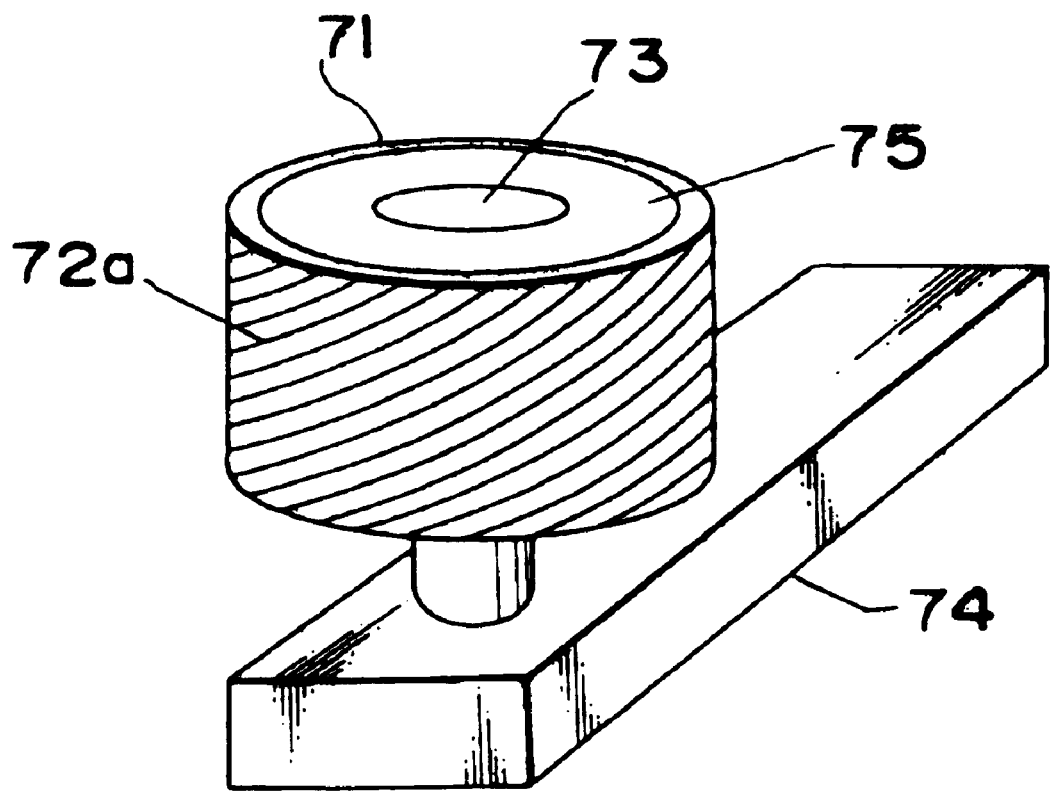

Fourteenth Embodiment—FIG. 27

The head cleaner according to a fourteenth preferred embodiment of the present invention is similar to that shown in and described with reference to FIG. 26, but differs therefrom in that the abrasive paint containing alumina particles of 1 µm in particle size is applied by the use of a gravure roll coating technique to about 60% of one surface of the cleaning sheet 72a. As is the case with the cleaning sheet shown in FIG. 26, the cleaning sheet 72a is bonded to the outer peripheral surface of the soft member 75 by the use of a length of the double-sided adhesive tape substantially free from generation of chlorine and organopolysiloxane gases with the partially coated surface of the cleaning sheet 72a oriented radially outwardly.

According to this embodiment, when the rotary roller 71 is brought into contact with the rotary head-carrier drum 7, the coated (abrasive) and non-coated surface areas of the cleaning sheet 72a alternately contact the rotary magnetic heads with a proper elasticity and, therefore, the foreign matter sticking to the rotary magnetic heads can be removed effectively and efficiently. If the surface area of the cleaning sheet 72a where the abrasive paint is applied is smaller than 30% of the entire surface area thereof, no sufficient abrading effect can be obtained. On the other hand, if the surface area of the cleaning sheet 72 where the abrasive paint is applied is greater than 80% of the entire surface area thereof, the abrading effect may be increased, but the cleaning sheet 72a will fail to sufficiently trap the foreign matter abraded from the rotary magnetic heads, allowing the once-removed foreign matter to re-adhere to the rotary magnetic heads and/or to various guide posts disposed in the tape transport system which may eventually result in trouble in information recording or reproducing. For this reason, the surface area of the cleaning sheet 72a where the abrasive paint is applied should preferably be within the range of 30 to 80%.

Figure 28:
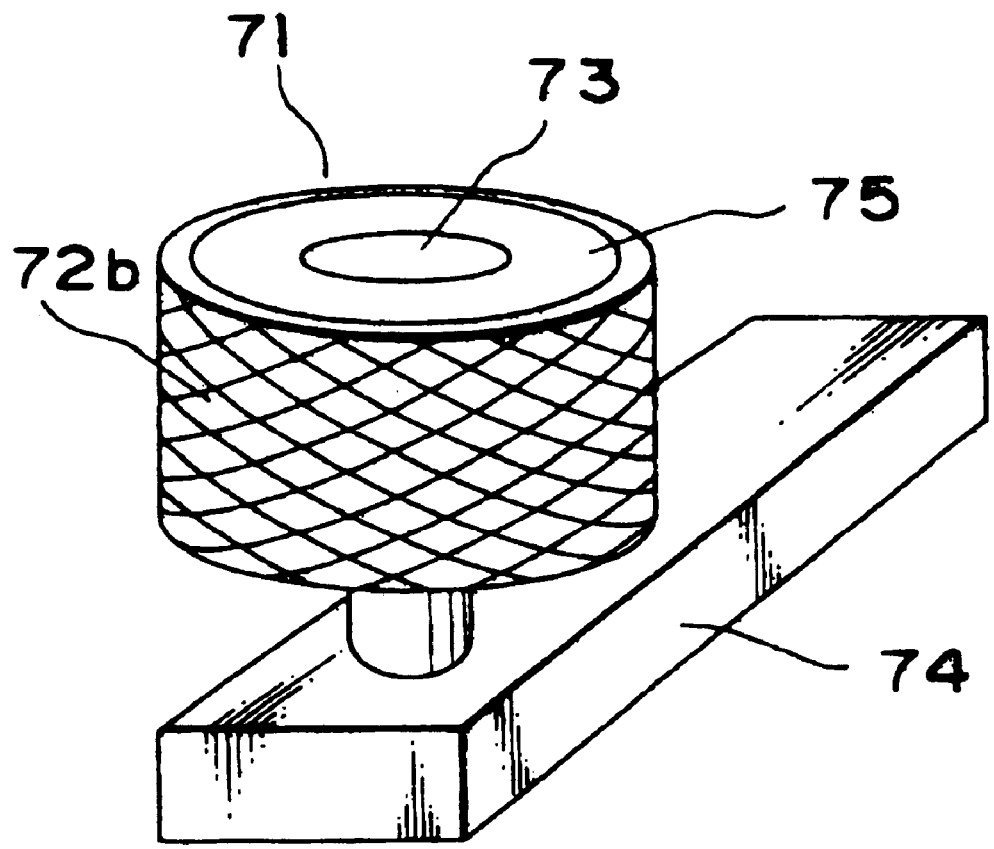

Fifteenth Embodiment—FIG. 28

The head cleaner according to a fifteenth preferred embodiment of the present invention is shown in FIG. 28 and is similar to that shown in and described with reference to FIG. 26, but differs therefrom in that polyester fibers of about 20 µm in fiber diameter are employed to form an oblong web of non-woven fabric, 170 µm in total thickness, forming the cleaning sheet 72b and in that the abrasive paint containing alumina particles of 0.5 µm in particle size is applied by the use of a gravure roll coating technique, followed by impregnation of a lubricant in the cleaning sheet 72b.

As is the case with any one of the embodiments shown respectively in FIGS. 26 and 27, the length of the double-sided adhesive tape substantially free from generation of chlorine and organopolysiloxane gases is employed to bond the cleaning sheet 72b to the outer peripheral surface of the soft member 75.

The lubricant employed may be perphloropolyether (PFPE) of a composition expressed by the following chemical formula:

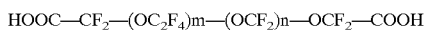

wherein m and n is an integer not smaller than 1. PFPE is known as a lubricant having a resistance to heat and chemicals and also incombustibility and is superior to such a lubricant as silicone oil or higher fatty acid. Also, PFPE is in a liquid phase at room temperatures and is therefore easy to penetrate into the non-woven fabric.

PFPE may not be of a kind expressed by the above chemical formula. Although in the above chemical formula the composition has a carboxyl group at each terminal thereof, an amino group, a hydroxy group or a sulfone group may be introduced to increase the adherence to the rotary magnetic heads.

According to this embodiment, when the rotary roller 71 is brought into contact with the rotary head-carrier drum 7, the coated (abrasive) surface of the cleaning sheet 72b contacts the rotary magnetic heads with a proper elasticity and, therefore, the foreign matter sticking to the rotary magnetic heads can be removed effectively and efficiently. Also, the use of the lubricant is advantageous in that the resistance to wear of the rotary magnetic heads can be increased and, at the same time, it minimizes the adherence of foreign matter to the rotary magnetic heads.

It is to be noted that although in the foregoing description the lubricant has been described as impregnated in the cleaning sheet 72b after the abrasive paint has been coated on the surface thereof, the use may be made of the abrasive paint in which the abrasive particles and the lubricant are mixed together.

Figure 29:
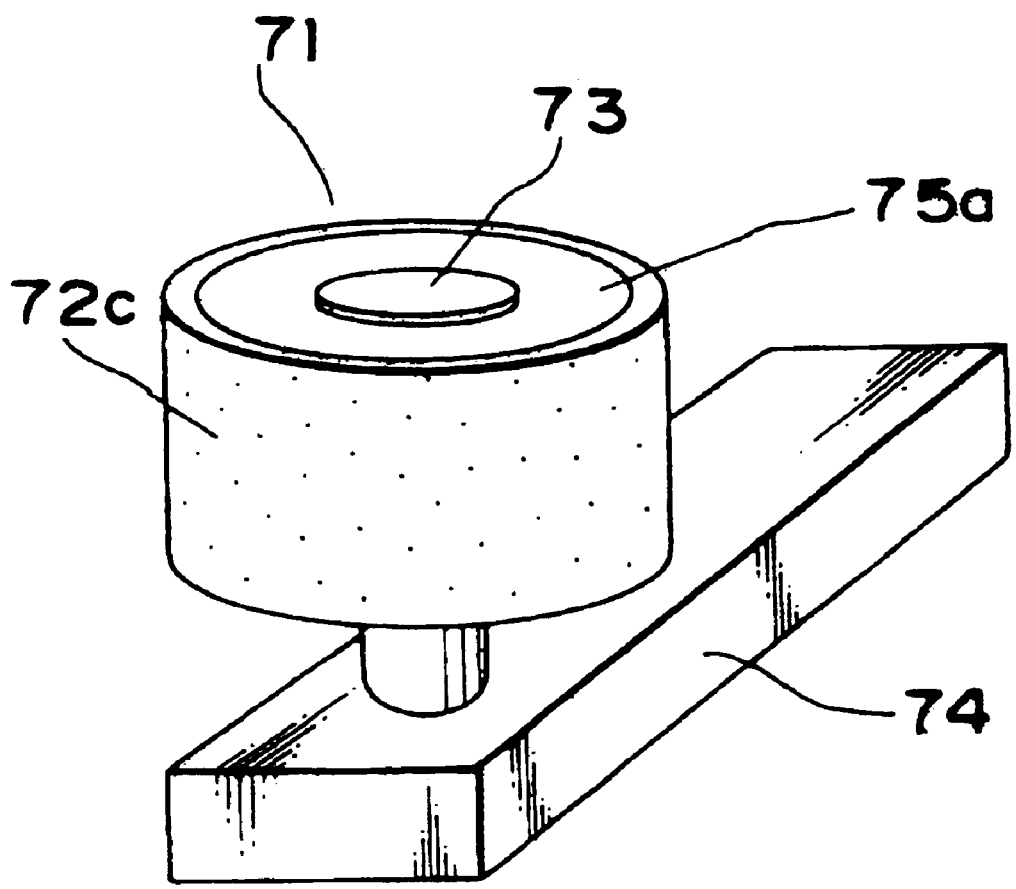
Figure 30:
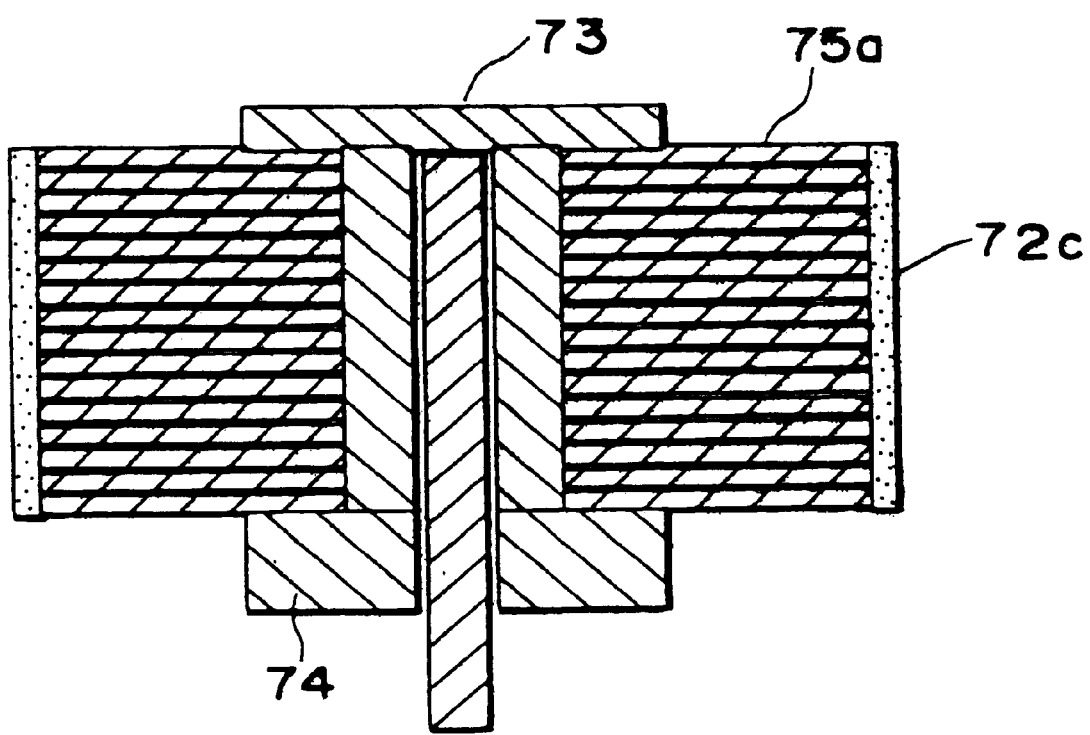
FIG. 30 is a schematic longitudinal sectional view of the head cleaner according to the sixteenth embodiment shown in FIG. 29.

Sixteenth Embodiment—FIGS. 29 & 30

Referring now to FIGS. 29 and 30, there is shown the head cleaner according to a sixteenth preferred embodiment of the present invention. In this embodiment, the cleaning sheet 72c is in the form of an oblong web of non-woven fabric, made of nylon fibers of about 20 µm in fiber diameter, and having one surface coated with alumina particles of 1 µm to render the cleaning sheet 72c to have a total thickness of 180 µm. The soft member 75a comprises, as best shown in FIG. 30, a plurality of, for example, 35, annular webs of non-woven fabric, for example, about 100 µm in thickness, stacked together to render it to represent a generally tubular configuration. As is the case with any one of the foregoing embodiments, the cleaning sheet 72c is bonded with the use of the length of double-sided adhesive tape to the outer peripheral surface of the soft member 75a.

According to this embodiment, when the rotary roller 71 is brought into contact with the rotary head-carrier drum 7, the head cleaner 71 undergoes deformation to conform to the shape of each of the rotary magnetic heads and, therefore, the foreign matter sticking to the rotary magnetic heads can be removed effectively and efficiently. Also, by adjusting the thickness and density of the non-woven fabric webs used to form the soft member 75a, the elasticity of the head cleaner during operation can be adjusted.

Figure 31:
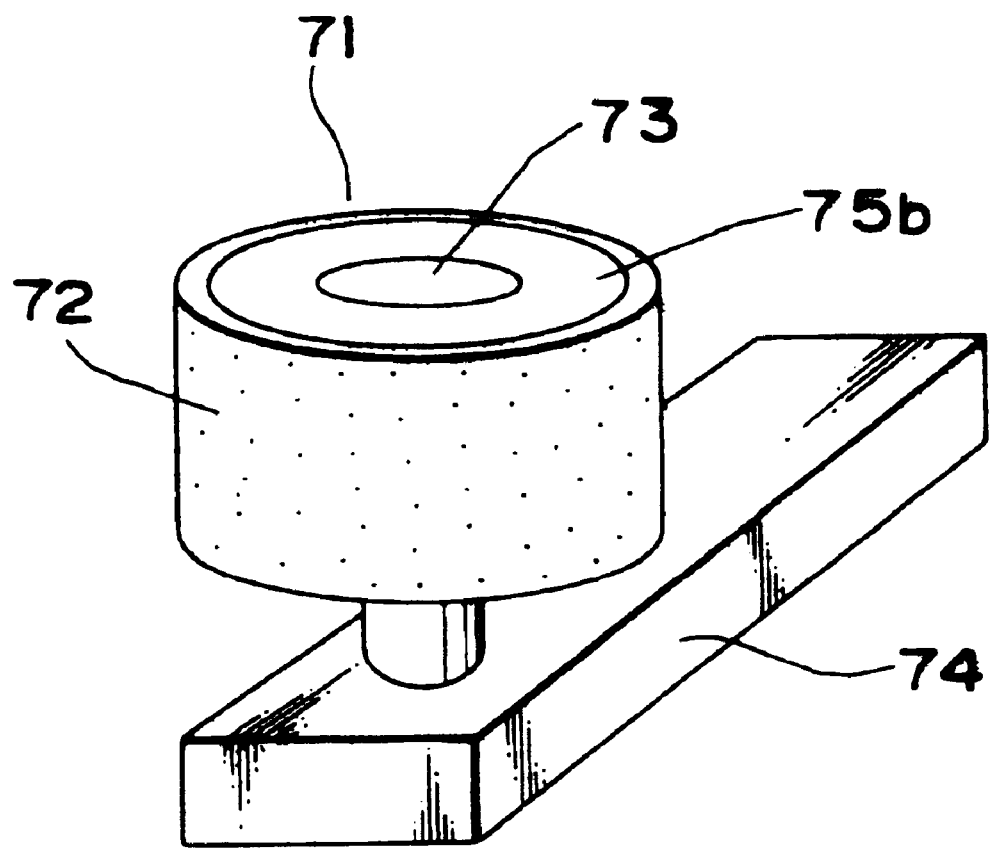
FIG. 31 is a schematic perspective view of the head cleaner according to a seventeenth preferred embodiment of the present invention.
Figure 32:
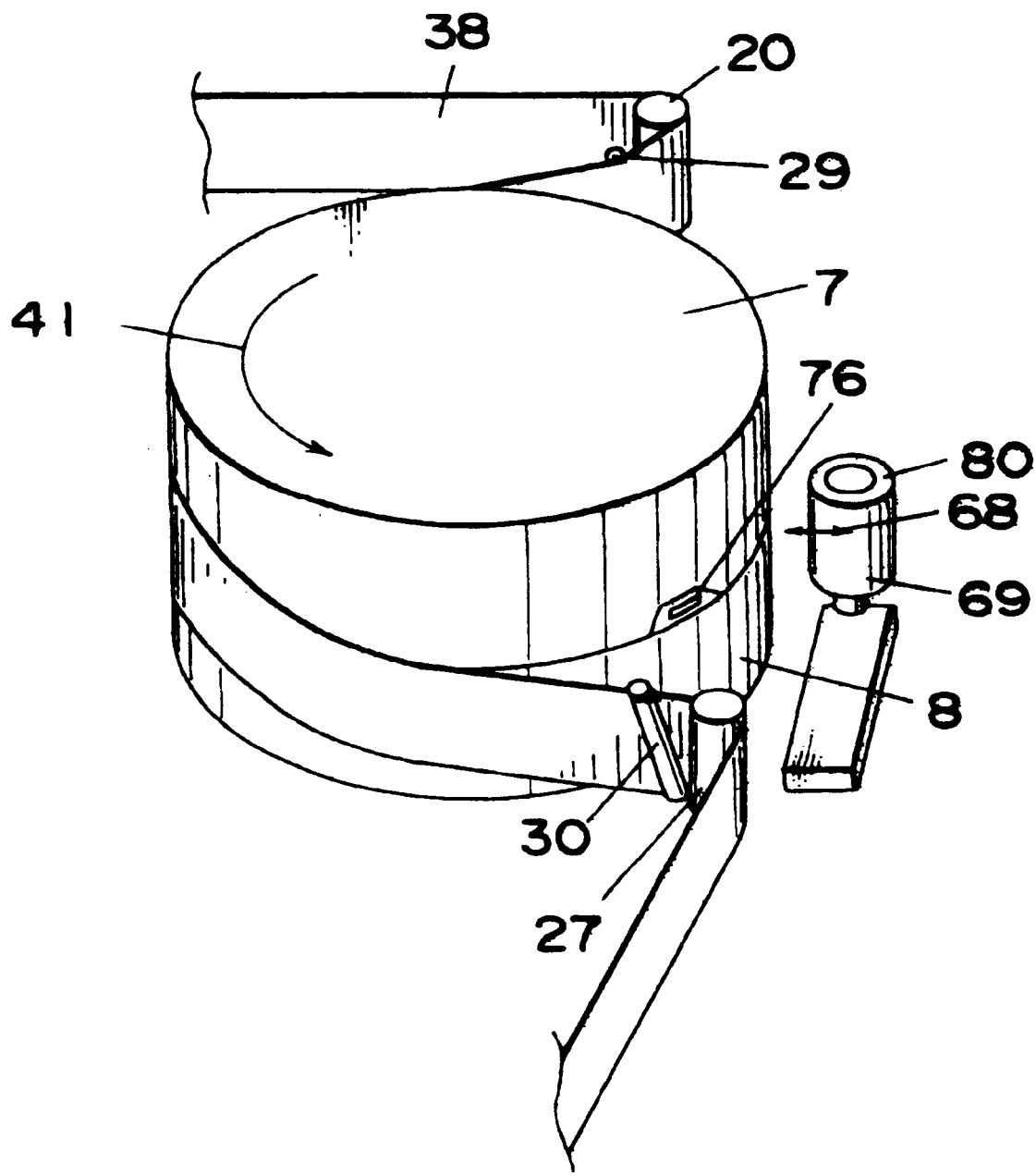
FIG. 32 is a schematic perspective view showing the prior art head cleaner used in association with the head-carrier drum.

Seventeenth Embodiment—FIG. 31

In a seventeenth preferred embodiment of the present invention shown in FIG. 31, the head cleaner shown therein is substantially similar to that shown in any one of FIGS. 27 and 28, but differs therefrom in that the cleaning sheet 71, 180 μm in total thickness, in the form of the web of non-woven fabric of nylon fibers of about 15 μm in fiber diameter and coated on one surface thereof with the abrasive paint containing alumina particles of 1 μm in particle size is boded by means of the length of double-sided adhesive tape to the outer peripheral surface of the tubular soft member 75b made of sponge having a modulus of elasticity of 0.2 MPa.

The cleaning effect exhibited by the head cleaner according to this embodiment of FIG. 31 to clean the rotary magnetic heads is considerably affected by the elasticity of the soft member 75b. Accordingly, the soft member 75b should preferably have a modulus of elasticity within the range of 0.1 to 2 MPa. If the modulus of elasticity of the soft member 75b is lower than 0.05 MPa, the soft member 75b is too soft to accomplish a satisfactory head cleaning. Conversely, if it is higher than 2 MPa, contact between the head cleaner and the respective slide faces of the rotary magnetic heads will be adversely affected with the head cleaner consequently failing to accomplish the satisfactory cleaning. Also, if the soft member 75b is hard, an impact which occurs when the head cleaner is brought into contact with the rotary magnetic heads will not be absorbed, resulting in damage to head chips of the rotary magnetic head.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A head cleaner for a magnetic recording and/or reproducing apparatus comprising a rotary head-carrier drum carrying at least one magnetic head for rotation together therewith, said magnetic head having a slide face contactable with a length of magnetic tape, said head cleaner comprising:

a cleaning roller including a sheet-like non-woven fabric contactable with the slide face of the magnetic head, at least a portion of the non-woven fabric having an abrading capability, wherein the non-woven fabric has one surface partially coated with abrasive material containing abrasive particle of not greater than 1 μm in particle size.

2. The head cleaner as claimed in claim 1, further comprising an abrasive paint containing abrasive particles and a binder, said abrasive paint being applied on one surface of the sheet-like non-woven fabric.

3. The head cleaner as claimed in claim 2, wherein said sheet-like non-woven fabric having been painted with the abrasive particles has a total thickness not greater than 200 μm.

4. The head cleaner as claimed in claim 1, wherein the sheet-like non-woven fabric contains at least nylon fibers.

5. A head cleaner for a magnetic recording and/or reproducing apparatus comprising a rotary head-carrier drum carrying at least one magnetic head for rotation together therewith, said magnetic head having a slide face contactable with a length of magnetic tape, said head cleaner comprising:

a tubular soft member; and a sheet-like non-woven fabric partially having an abrading capability and turned around the tubular soft member, wherein the sheet-like non-woven fabric has one surface partially coated with abrasive material containing abrasive particles of not greater than 1 μm in particle size.

6. The head cleaner as claimed in claim 5, wherein the sheet-like non-woven fabric is made of fibers of 10 to 30 μm in fiber diameter and has one surface thereof partially coated with abrasive material.

\* \* \* \* \*